United States Patent
Patil et al.

(10) Patent No.: US 9,247,453 B2
(45) Date of Patent: Jan. 26, 2016

(54) METHODS AND APPARATUS FOR WAN ASSISTED CONTENTION DETECTION AND RESOLUTION IN PEER TO PEER NETWORKS

(71) Applicant: QUALCOMM Incorporated, San Diego, CA (US)

(72) Inventors: Shailesh Patil, Bridgewater, NJ (US); Hua Wang, Bridgewater, NJ (US); Xinzhou Wu, Hillsborough, NJ (US); Junyi Li, Chester, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/311,627

(22) Filed: Jun. 23, 2014

(65) Prior Publication Data

US 2014/0301326 A1    Oct. 9, 2014

Related U.S. Application Data

(62) Division of application No. 13/229,399, filed on Sep. 9, 2011, now Pat. No. 8,787,280.

(51) Int. Cl.
*H04W 4/00* (2009.01)
*H04W 28/04* (2009.01)
*H04W 76/02* (2009.01)

(52) U.S. Cl.
CPC ............ *H04W 28/046* (2013.01); *H04W 4/005* (2013.01); *H04W 76/021* (2013.01); *H04W 28/044* (2013.01); *H04W 76/023* (2013.01)

(58) Field of Classification Search
None
See application file for complete search history.

(56) References Cited

U.S. PATENT DOCUMENTS

| 6,665,300 B1 | 12/2003 | Caves et al. |
| 7,639,709 B1 | 12/2009 | Amis et al. |
| 8,005,091 B2 | 8/2011 | Wu et al. |
| 2008/0095042 A1 | 4/2008 | McHenry et al. |

(Continued)

FOREIGN PATENT DOCUMENTS

| EP | 1610577 A1 | 12/2005 |
| JP | 2007535858 A | 12/2007 |

(Continued)

OTHER PUBLICATIONS

International Preliminary Report on Patentability—PCT/US2012/054246, The International Bureau of WIPO—Geneva, Switzerland, Mar. 20, 2014.

(Continued)

*Primary Examiner* — Minh-Trang Nguyen
(74) *Attorney, Agent, or Firm* — James K. O'Hare

(57) ABSTRACT

Various methods and apparatus are directed to collision detection and/or avoidance regarding peer to peer connection identifiers. A wireless communications device broadcasts a signal indicating its acquired connection identifier in one of two alternative blocks. A base station monitors peer to peer signaling in its coverage area and tracks the usage of peer to peer connection identifiers by pairs of devices. The base station detects when multiple pairs of devices are using the same peer to peer connection identifier. The base station provides assistance to the peer to peer network to avoid a collision or facilitate rapid collision detection by the peer to peer devices. In one approach the base station sends an instruction for a connection to switch its connection identifier. In another approach the base station sends a connection a message to bias its selection as to which of the two alternative blocks to use for transmission.

15 Claims, 24 Drawing Sheets

(56) References Cited

U.S. PATENT DOCUMENTS

| | | |
|---|---|---|
| 2008/0130519 A1 | 6/2008 | Bahl et al. |
| 2009/0017801 A1 | 1/2009 | Laroia et al. |
| 2009/0046683 A1* | 2/2009 | Jung et al. .................. 370/338 |
| 2009/0168722 A1 | 7/2009 | Saifullah et al. |
| 2009/0196180 A1 | 8/2009 | Bahl et al. |
| 2010/0254281 A1 | 10/2010 | Kim et al. |
| 2011/0058514 A1 | 3/2011 | Lee et al. |
| 2011/0066738 A1 | 3/2011 | Richardson et al. |
| 2013/0064187 A1 | 3/2013 | Patil et al. |

FOREIGN PATENT DOCUMENTS

| | | |
|---|---|---|
| JP | 2009516418 A | 4/2009 |
| KR | 20060031817 A | 4/2006 |
| KR | 20070080544 A | 8/2007 |
| WO | WO-9944389 A1 | 9/1999 |
| WO | WO-2006001650 A1 | 1/2006 |
| WO | WO-2007055623 A1 | 5/2007 |
| WO | WO-2009009364 A1 | 1/2009 |
| WO | WO-2009009390 A1 | 1/2009 |
| WO | WO-2009009537 | 1/2009 |
| WO | WO-2010078273 A2 | 7/2010 |

OTHER PUBLICATIONS

International Search Report and Written Opinion—PCT/US2012/054246—ISA/EPO—Nov. 14, 2012.

* cited by examiner

METHODS AND APPARATUS FOR WAN ASSISTED CONTENTION DETECTION AND RESOLUTION IN PEER TO PEER NETWORKS

CROSS REFERENCE TO RELATED APPLICATIONS

This application is a division of U.S. patent application Ser. No. 13/229,399 now U.S. Pat. No. 8,787,280 entitled "METHODS AND APPARATUS FOR WAN ASSISTED CONTENTION DETECTION & RESOLUTION IN PEER TO PEER NETWORKS" filed on Sep. 9, 2011 which is hereby incorporated in its entirety by reference.

FIELD

Various embodiments are directed to wireless communications methods and apparatus and, more particularly, to base station assisted methods and apparatus for detecting and/or avoiding collision in peer to peer networks.

BACKGROUND

In some peer to peer networks a pair of devices acquires a connection identifier and uses the acquired connection identifier for further signaling in the peer to peer network. At the time of acquisition, the devices acquiring the connection identifier perceive the acquired connection identifier and corresponding communications resources to be unused in their local vicinity. Each connection identifier may be associated with specific air link resources in a recurring peer to peer timing structure such as traffic transmission request resources. It is desirable that a connection identifier being used by a pair of devices be locally unique to avoid collisions in the peer to peer network. Due to mobility, two pairs of devices using the same connection identifier which were at one time widely separated in terms of distance may, over time, come within an unacceptable range of each other with regard to interference levels.

A peer to peer wireless device which has acquired a connection identifier may broadcast its connection identifier such that other devices in its vicinity which are monitoring may be able to detect it. However, a peer to peer device which is transmitting its connection identifier normally can not be simultaneously monitoring for connection identifiers from other devices. Devices corresponding to different connections may be operating independently and not coordinated with regard to transmission and reception of connection identifier broadcast signals. The peer to peer devices may randomly decide whether to transmit a peer to peer connection identifier signal or to monitor for a peer to peer connection identifier signal in a peer to peer connection resource block. Over time two connections which independently randomly decide whether to transmit or receive using the same connection identifier should be able to detect one another, but this detection approach may not be efficient and may take a long time before the two pairs of connections recognize that they are using the same connection identifier depending upon circumstances.

To speed up the detection, large amounts of air link resources in the structure can be dedicated to broadcasting and monitoring for connection identifier signals, e.g., allowing broadcasting of a connection identifier signal to occur more frequently. However, air link resources are limited and use of such resources for connection identifier signals is at the expense of other uses such as peer to peer traffic signals. In addition, frequent broadcast and monitoring of peer to peer connection identifier signals results in more rapid battery depletion of devices than if less frequent signaling was used.

In view of the above, there is a need for new methods and apparatus that facilitate collision avoidance and/or facilitate rapid collision detection with regard to connection identifiers and/or other signals in a peer to peer communications system.

SUMMARY

Various methods and apparatus are directed to collision detection and/or collision avoidance with regard to peer to peer connection identifiers in a peer to peer wireless communications system. A wireless communications device which has a peer to peer connection, broadcasts a signal indicating its acquired peer to peer connection identifier. A base station, e.g., a WAN base station, monitors peer to peer signaling in its coverage area and tracks the usage of peer to peer connection identifiers by pairs of devices. The base station detects when multiple pairs of devices are using the same peer to peer connection identifier in its coverage area. The base station provides assistance to the peer to peer network to avoid a collision or facilitate rapid collision detection by the peer to peer devices.

In some embodiments, two blocks of resources are used for transmitting peer to peer connection identifier broadcast signals. A peer to peer wireless device, which has a peer to peer connection, transmits using at least a portion of one block and monitors the other block. The peer to peer device selects and varies which block to use for transmission and which block to use for monitoring over time, e.g., with some degree of randomness or pseudo-randomness.

The base station monitors both blocks for connection identifier broadcast signals. In various embodiments, the detection range by the base station exceeds the detection range possible by peer to peer devices. In some embodiments, in response to detecting that multiple connections are using the same peer to peer connection identifier, the base station sends an instruction to one connection to change to a different peer to peer connection identifier. In some embodiments, in response to detecting that multiple connections are using the same peer to peer connection identifier, the base station sends a message to a connection to bias the selection of which block to transmit on. This biasing of selection increases the probability that the two connections using the same peer to peer connection identifier will detect that a collision condition. For example, a first connection can be biased, in response to a base station signal, to predominately transmit its connection identifier on the first block and monitor on the second block, while a second connection can be biased, in response to a base station signal, to monitor on the first block and transmit its connection identifier on the second block. Then, if the two connections come within detection proximity of one another, because of the base station assisted biasing, the two connections are more likely to rapidly detect the collision condition than would otherwise be possible without the base station assistance.

A method of operating a base station, in accordance with some embodiments, comprises tracking usage of connection identifiers by pairs of communications devices; and performing an operation to reduce the risk of collisions or increase the probability of collision detection when it is detected that multiple pairs of communications devices within the coverage area of said base station are using the same connection identifier. An exemplary base station, in accordance with some embodiments, comprises: at least one processor configured to: track usage of connection identifiers by pairs of communications devices and perform an operation to reduce the risk of collisions or increase the probability of collision detection when it is detected that multiple pairs of communications devices within the coverage area of said base station are using the same connection identifier. The exemplary base station further comprises memory coupled to said at least one processor.

An exemplary method of operating a wireless communications device, in accordance with some embodiments, comprises: receiving from a base station at least one of: (i) an instruction to switch to a different peer to peer connection identifier than the peer to peer connection identifier currently being used by the wireless communications device and (ii) a message to bias use of peer to peer connection signaling transmission resources to a first subset of resources corresponding to a peer to peer connection identifier in comparison to a second subset of resources corresponding to said peer to peer connection identifier. The exemplary method further comprises switching from said current peer to peer connection identifier to another peer to peer connection identifier in response to said instruction to switch or detection of use of said current peer to peer connection identifier by another device.

An exemplary wireless communications device, in accordance with some embodiments, comprises at least one processor configured to: receive from a base station at least one of: (i) an instruction to switch to a different peer to peer connection identifier than the peer to peer connection identifier currently being used by the wireless communications device and (ii) a message to bias use of peer to peer connection signaling transmission resources to a first subset of resources corresponding to a peer to peer connection identifier in comparison to a second subset of resources corresponding to said peer to peer connection identifier; and switch from said current peer to peer connection identifier to another peer to peer connection identifier in response to said instruction to switch or detection of use of said current peer to peer connection identifier by another device. The exemplary wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
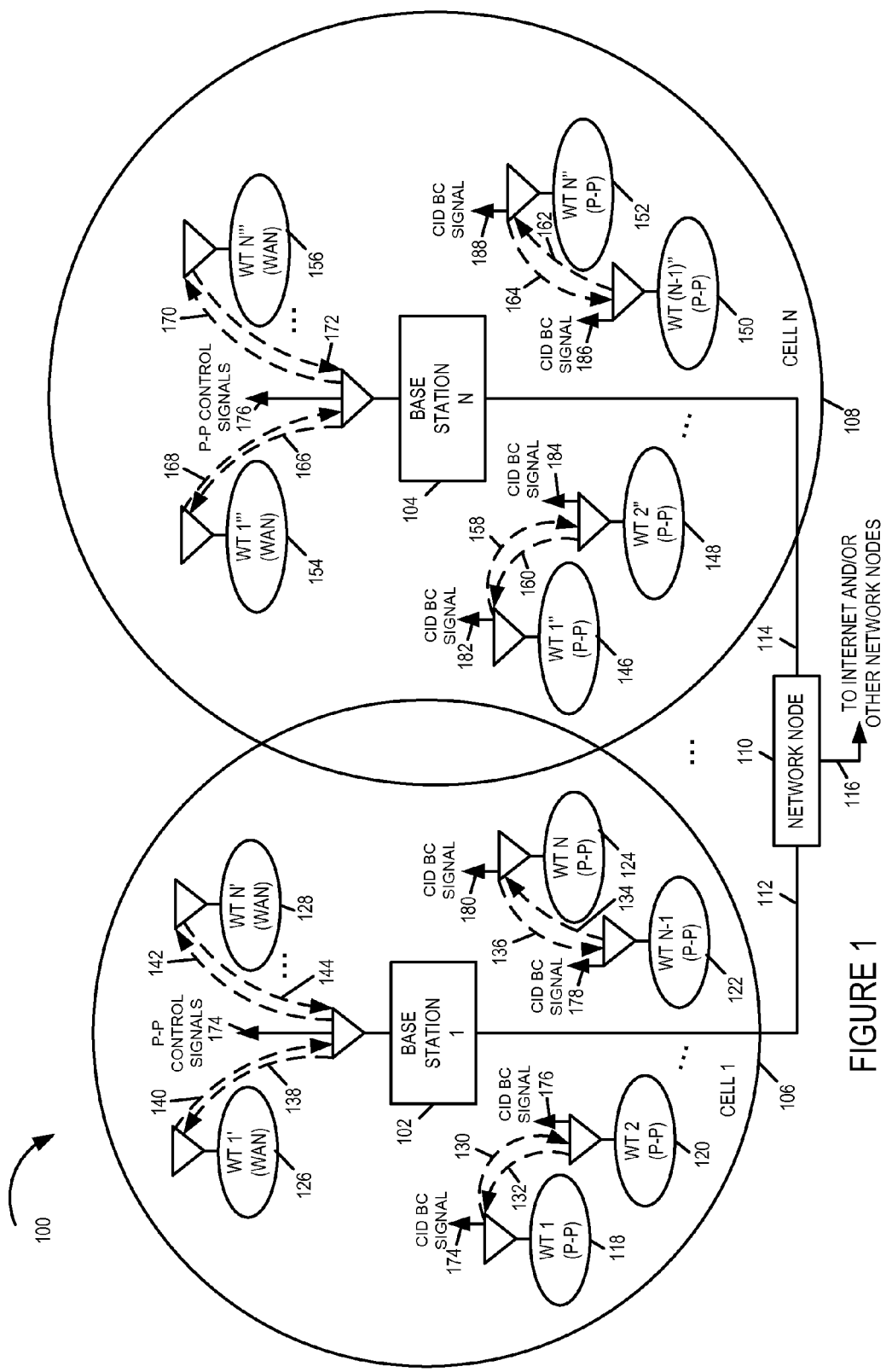
FIG. 1 is a drawing of an exemplary wireless communications system in accordance with an exemplary embodiment.

FIG. 1 is a drawing of an exemplary wireless communications system 100 in accordance with an exemplary embodiment. Exemplary wireless communications system 100 includes a plurality of base stations (base station 1 102, . . . base station N 104), each with a corresponding coverage area (cell 1 106, . . . , cell N 108), respectively. The base station (102, . . . , 104) are coupled to a network node 110 via network links (112, . . . , 114), respectively. Network node 110 is coupled to the Internet and/or to other network nodes via link 116.

In the wireless communications system 100 there are a plurality of wireless communications device, e.g., wireless terminals. Some of the wireless communications devices support peer to peer communications. Some of the wireless communications devices support wide are network (WAN) communications, and some of the wireless communications devices support both peer to peer and WAN communications. Some of the wireless communications devices are mobile devices which may move throughout the system 100. In FIG. 1, there are a plurality of wireless terminals in cell 1 106 which are using peer to peer communications (WT 1 118, WT 2 120, . . . , WT N-1 122, WT N 124). Within cell 1 106, there are also a plurality of wireless terminals which are using cellular WAN communications (WT 1' 126, . . . , WT N' 128). WT 1 118 has a peer to peer connection with WT 2 120. WT 1 118 exchanges direct peer to peer signals (130, 132) with WT 2 120. WT N-1 122 has a peer to peer connection with WT N 124. WT N-1 122 exchanges direct peer to peer signals (134, 136) with WT N 124. WT 1' 126 received downlink WAN signals 138 from base station 1 102 and transmits uplink WAN signals 140 to base station 1 102. WT N' 128 received downlink WAN signals 142 from base station 1 102 and transmits uplink WAN signals 144 to base station 1 102.

In FIG. 1, there are a plurality of wireless terminals in cell N 108 which are using peer to peer communications (WT 1" 146, WT 2" 148, . . . , WT (N-1)" 150, WT N" 152). Within cell N 108, there are also a plurality of wireless terminals which are using cellular WAN communications (WT 1''' 154, . . . , WT N''' 156). WT 1" 146 has a peer to peer connection with WT 2" 148. WT 1" 146 exchanges direct peer to peer signals (158, 160) with WT 2" 148. WT (N-1)" 150 has a peer to peer connection with WT N" 152. WT (N-1)" 150 exchanges direct peer to peer signals (162, 164) with WT N" 152. WT 1''' 154 receives downlink WAN signals 166 from base station N 104 and transmits uplink WAN signals 168 to base station N 104. WT N''' 156 receives downlink WAN signals 170 from base station N 104 and transmits uplink WAN signals 172 to base station N 104.

Wireless communications devices using peer to peer signaling and having a peer to peer connection also transmit a connection identifier broadcast signal. The connection identifier broadcast signal is monitored by other peer to peer devices and by base stations. In FIG. 1 wireless communications devices (WT 1 118, WT 2 120, WT N-1 122, WT N 124, WT 1" 146, WT 2" 148, WT (N-1)" 150, WT N" 152) transmit broadcast signals (174, 176, 178, 180, 182, 184, 186, 188), respectively. The base stations (102, 104), in addition to performing WAN operations, also monitor the CID broadcast signaling from devices using peer to peer communications and other peer to peer signaling and track the usage of connection identifiers by pairs of communications devices. A base station (102, 104) performs an operation to reduce the risk of collisions or increase the probability of collision detection when the base station detects that multiple pairs of communications devices within its coverage area are using the same peer to peer connection identifier. Base stations (102, 104) transmit peer to peer control signals (174, 176) to influence peer to peer network communications. Peer to peer control signals (174, 176) include one or more or all of: an instruction to one of multiple pairs of communications devices detected to be using the same connection identifier to switch to a different connection identifier, a message to a first pair of devices using the same connection identifier as a second pair of devices to bias use of connection signaling transmission resources to a first subset of resources corresponding to the connection identifier, and a message to a second pair of devices using the same connection identifier as the first pair of devices to bias use of connection signaling transmission resources to a second subset of resources corresponding to the connection identifier.

Figure 2:
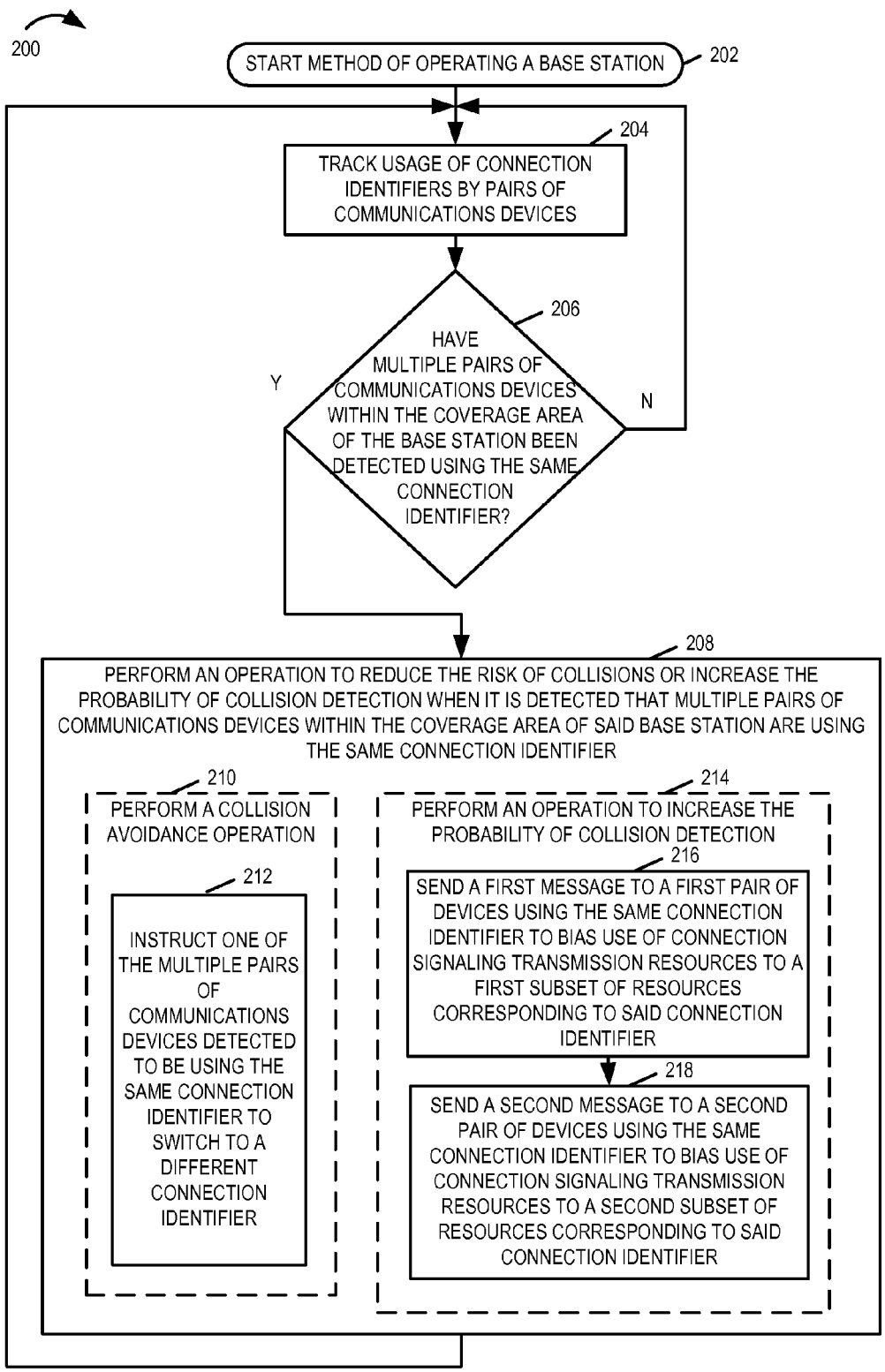
FIG. 2 is a flowchart of an exemplary method of operating a base station in accordance with various embodiments.

FIG. 2 is a flowchart 200 of an exemplary method of operating a base station in accordance with various embodiments. Operation starts in step 202, where the base station is powered on and initialized. Operation proceeds from start step 202 to step 204. In step 204 the base station tracks usage of connection identifiers by pairs of communications devices. In some embodiments, the pairs of communications devices are pairs of communications devices in an ad hoc wireless communications networks. In some embodiments the pairs of communications devices are pairs of peer to peer communications devices. Operation proceeds from step 204 to step 206.

In step 206 the base station determines whether or not multiples pairs of communications devices within the coverage area of the base station have been detected using the same connection identifier. If multiple pairs of communications devices within the coverage area of the base station have not been detected using the same connection identifier, then operation proceeds from step 206 back to step 204 for additional tracking of connection identifiers being used by pairs of communications devices. However, if multiple pairs of communications devices with the coverage area of the base station have been detected using the same connection identifier, then operation proceeds from step 206 to step 208.

In step 208 the base station performs an operation to reduce the risk of collisions or increase the probability of collision detection when it is detected that multiple pairs of communications devices with the coverage area of the base station are using the same connection identifier. In some embodiments, step 208 includes step 210. In some other embodiments, step 208 includes step 214. In some embodiments, step 208 includes both step 210 and step 214, e.g., with different ones of step 210 and step 214 being selected at different times, e.g., in response to different conditions within the system.

Returning to step 210, in step 210 the base station performs a collision avoidance operation. Step 210 includes step 212 in which the base station instructs one of the multiple pairs of communications devices detected to be using the same connection identifier to switch to a different connection identifier.

Returning to step 214, in step 214 the base station performs an operation to increase the probability of collision detection. Step 214 includes steps 216 and 218. In step 216 the base station sends a first message to a first pair of devices using the same connection identifier to bias use of connection signaling resources to a first subset of transmission resources corresponding to said connection identifier. Then, in step 218 the base station sends a second message to a second pair of devices using the same connection identifier to bias use of the connection signaling resources to a second subset of resources corresponding to the connection identifier.

In some embodiments, the connection signaling resources are sets of time and frequency resources such as tone-symbols used for connection identifier (CID) broadcasts. In some embodiments, the first and second subsets of resources are sets of tone-symbols, and said first message controls the first pair of devices to transmit signals on tone-symbols in said first subset of resources more than on tone-symbols in the second subset of resources. In some embodiments, the first and second subsets of resources are sets of tone-symbols, and said second message controls the second pair of devices to transmit signals on tone-symbols in said second subset of resources more than on tone-symbols in the first subset of resources. In some embodiments, over time a device corresponding to a connection identifier, over time, may transmit signals on both tone-symbols of the first and second sets, but may be controlled to transmit more frequently on one subset than the other subset, e.g., as a function of a received first or second message from the base station.

Operation proceeds from step 208 to step 204 for additional tracking of connection identifiers used by pairs of communications devices.

Figure 3:
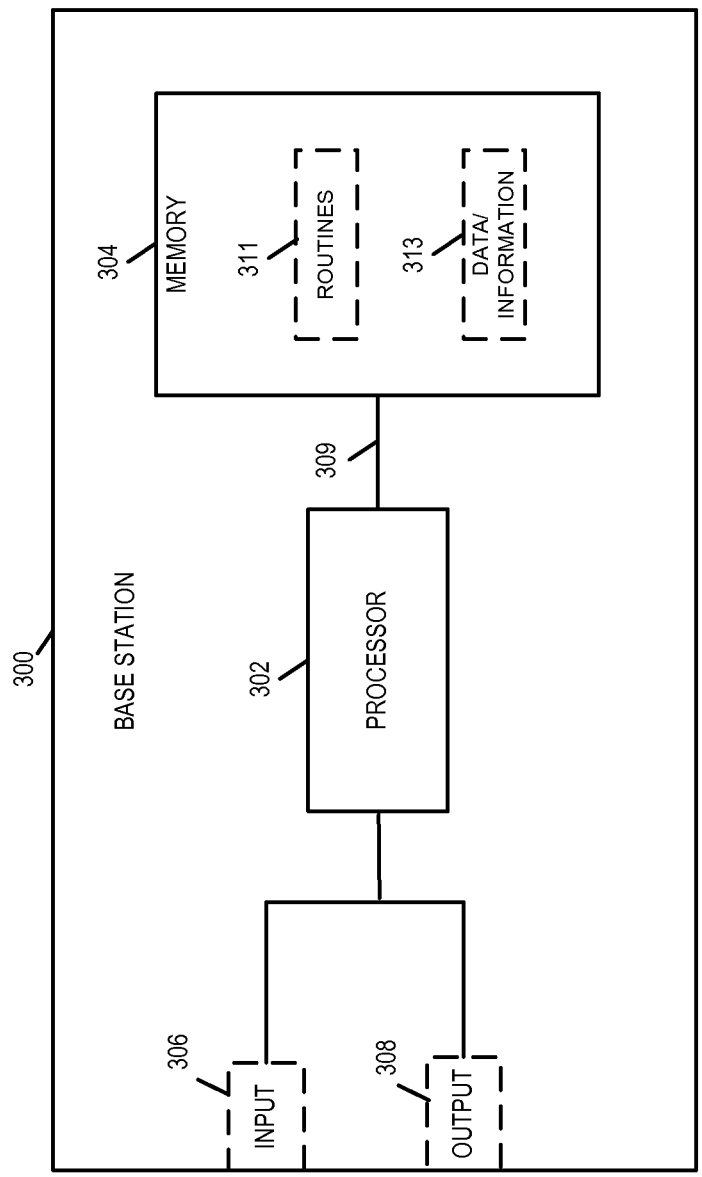
FIG. 3 is a drawing of an exemplary base station in accordance with an exemplary embodiment.

FIG. 3 is a drawing of an exemplary base station 300 in accordance with an exemplary embodiment. Exemplary base station 300 is, e.g., one of the base stations of system 100 of FIG. 1. Exemplary base station 300 may, and sometimes does, implement a method in accordance with flowchart 200 of FIG. 2.

Base station 300 includes a processor 302 and memory 304 coupled together via a bus 309 over which the various elements (302, 304) may interchange data and information. Base station 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to: track usage of connection identifiers by pairs of communications devices; and perform an operation to reduce the risk of collisions or increase the probability of collision detection when it is detected that multiple pairs of communications devices within the coverage area of said base station are using the same connection identifier. In some embodiments, processor 302 is configured to perform an operation to reduce the risk of collisions, as part of being configured to perform an operation to reduce the risk of collisions or increase the probability of collision detection. In some such embodiments, processor 302 is configured to instruct one of the multiple pairs of communications devices detected to be using the same connection identifier to switch to a different connection identifier, as part of being configured to perform an operation to reduce the risk of collisions.

In some embodiments, processor 302 is configured to perform an operation to increase the probability of collision detection, as part of being configured to perform an operation to reduce the risk of collisions or increase the probability of collision detection. In some such embodiments, processor 302 is configured to send a first message to a first pair of devices using the same connection identifier to bias use of connection signaling transmission resources by said first pair of devices to a first subset of resources corresponding to said connection identifier, as part of being configured to increase the probability of collision detection. In some such embodiments, processor 302 is further configured to send a second message to a second pair of devices using the same connection identifier to bias use of connection signaling resources to a second subset of resources corresponding to said connection identifier, as part of being configured to increase the probability of collision detection.

In various embodiments, the first and second subsets of resources are sets of tone-symbols, and the first message controls the first pair of devices to transmit signals on tone-symbols in said first subset of resources more than on tone-symbols in said second subset of resources. In some such embodiments, the said second message controls the second pair of devices to transmit signals on tone-symbols in said second subset of resources more than on tone-symbols in said first subset.

Figure 4:
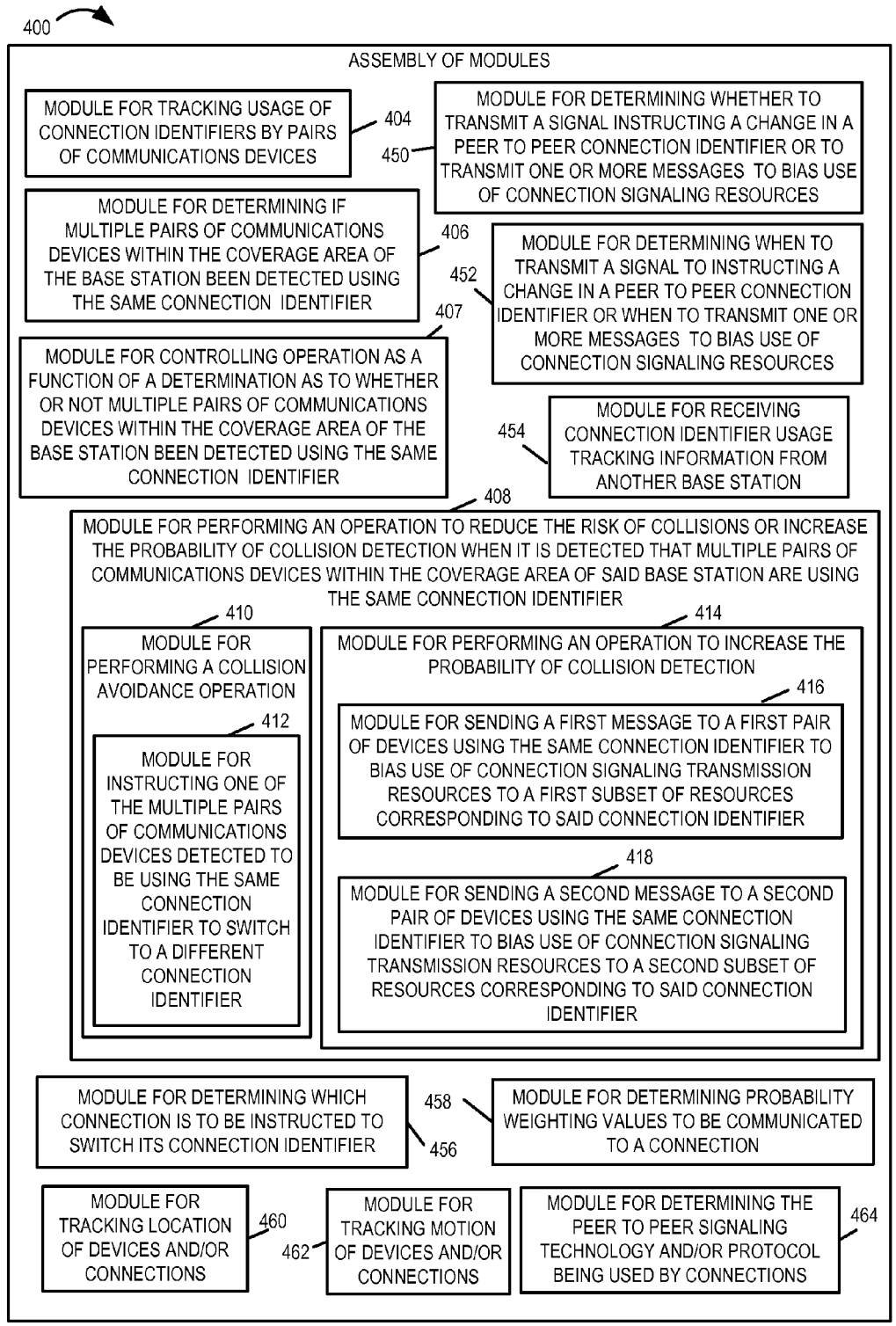
FIG. 4 is an assembly of modules which can, and in some embodiments is, used in the exemplary base station illustrated in FIG. 3.

FIG. 4 is an assembly of modules 400 which can, and in some embodiments is, used in the exemplary base station 300 illustrated in FIG. 3. The modules in the assembly 400 can be implemented in hardware within the processor 302 of FIG. 3, e.g., as individual circuits. Alternatively, the modules may be implemented in software and stored in the memory 304 of base station 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the base station 300 or elements therein such as the processor 302, to perform the functions of the corresponding steps illustrated and/or described in the method of flowchart 200 of FIG. 2.

Assembly of modules 400 includes a module 404 for tracking usage of connection identifiers by pairs of communications devices, a module 406 for determining if multiple pairs of communications devices within the coverage area of the base station have been detected using the same connection identifier, a module 407 for controlling operation as a function of a determination as to whether or not multiple pairs of communications devices within the coverage area of the base station have been detected using the same connection identifier, and a module 408 for performing an operation to reduce the risk of collisions or increase the probability of collision detection when it is detected that multiple pairs of communications devices with the coverage area of said base station are using the same connection identifier. Module 408 includes a module 410 for performing a collision avoidance operation and a module 414 for performing an operation to increase the probability of collision detection. Module 410 includes a module 412 for instructing one of the multiple pairs of communications devices detected to be using the same connection identifier to switch to a different connection identifier. Module 414 includes a module 416 for sending a first message to a first pair of devices using the same connection identifier to bias use of connection signaling transmission resources to a first subset of resources corresponding to the said identifier and a module 418 for sending a second message to a second pair of devices using the same connection identifier to bias use of connection signaling resources to a second subset of resources correspond to said connection identifier.

In various embodiments, the first and second subsets of resources are sets of tone-symbols, and the first message controls the first pair of devices to transmit signals on tone-symbols in said first subset of resources more than on tone-symbols in said second subset of resources. In some such embodiments, the said second message controls the second pair of devices to transmit signals on tone-symbols in said second subset of resources more than on tone-symbols in said first subset.

Assembly of modules 400 further includes a module 450 for determining whether to transmit a signal instructing a change in a peer to peer connection identifier or to transmit one or more messages to bias used of connection signaling resource. In some embodiments, module 450 makes its determination as a function of one or more or all of: the size of the wireless coverage are of the base station, the type of peer to peer to peer technology being used, peer to peer range information, and the peer to peer signal power information. Assembly of modules 400 further includes a module 452 for determining when to transmit a signal to instruct a change in a peer to peer connection identifier or when to transmit one or more messages to bias use of connection signaling resources.

In some embodiments, module 452 bases its decision as to when to transmit the signal and/or message or messages as a function of one or more of all of: peer to peer device position information, peer to peer connection position information, peer to peer device motion information, peer to peer connection motion information, estimated acceptable separation between peer to peer connections using the same connection identifier from an interference perspective, the peer to peer technology being used, peer to peer power transmission power levels, and the peer to peer signaling protocol being used.

Assembly of modules 400 further includes a module 454 for receiving connection identifier usage tracking information form another base station, a module 456 for determining which connection is to be instructed to switch its connection identifier, e.g., from among the two connections identified to be using the same connection identifier, a module 458 for determining probability weighting values to be communicated to a connection, e.g., in first and second messages to cause a bias in use of connection signaling transmission resources. Assembly of modules 400 further includes a module 460 for tracking location of devices and/or connections, a module 462 for tracking motion of devices and/or connections, and a module 464 for determining the peer to peer signaling technology and/or protocol being used by peer to peer connections.

Figure 5:
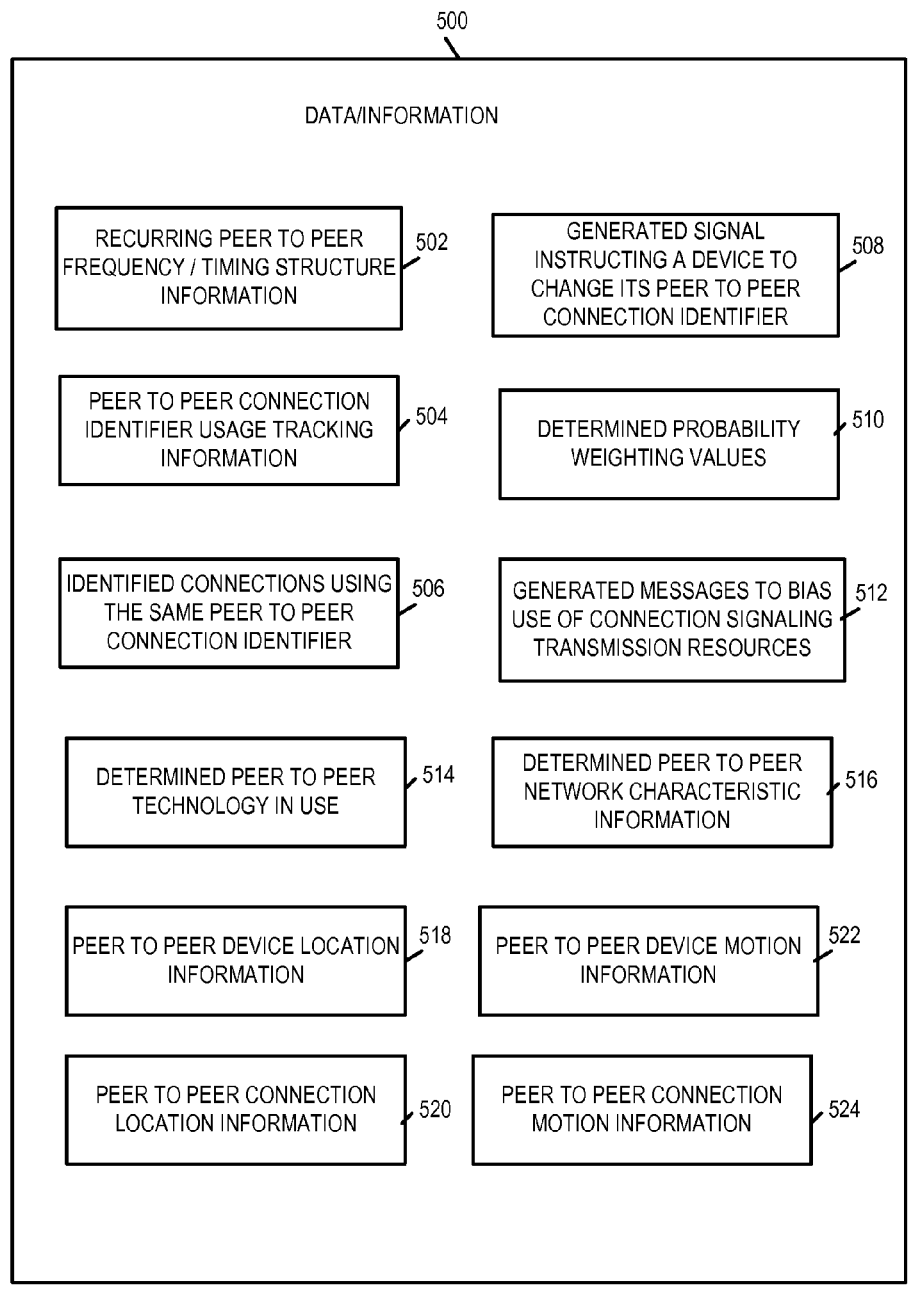
FIG. 5 is a drawing of exemplary data/information which may be included in the memory of the base station of FIG. 3 in accordance with an exemplary embodiment.

FIG. 5 is a drawing of exemplary data/information 500 in accordance with an exemplary embodiment. Exemplary data/information 500 may be, e.g., included in data/information 313 of memory 304 of base station 300 of FIG. 3. Data/information 500 includes recurring peer to peer frequency/timing structure information 502, peer to peer connection identifier usage tracking information 504, identified connections using the same peer to peer connection identifier 506, generated signal instructing a device to change its peer to peer connection identifier 508, determined probability weighting values 510, generated messages to bias use of connection signaling transmission resources 512, determined peer to peer technology and/or protocol in use 514, determined peer to peer network characteristic information 516, e.g., power level information, interference information, and/or range information, peer to peer device location information 518, peer to peer connection location information 520, peer to peer device motion information 522, and peer to peer connection motion information 524.

Various aspects and/or features of some, but not necessarily all embodiments, are discussed below. In a wide area network (WAN) scenario each of the communications between mobiles goes through at least one base station. In such a WAN scenario, uplink/downlink channels are used for communications between a plurality of mobiles and a base station. In some embodiments, a plurality of base stations are coupled together via a backhaul network.

In a case where two mobiles are in the vicinity of each other and want to communicate with one another, direct peer-to-peer communication between the two mobiles, without going through base station, can reduce the base station load. In some embodiments, this peer to peer communication can take place is the same frequency band as the WAN communications. In some embodiments, this peer to peer communications is in a different band than the WAN communications. In some embodiments, mobile devices may support both a WAN signaling protocol and a peer to peer signaling protocol. In some embodiments, mobile devices may, and sometimes do, movie back and forth between a WAN network and a peer to peer network, e.g., in response to WAN network loading and/or in response to peer to peer network loading and/or in response to mobile device to mobile device proximity. In some embodiments, wireless devices operating in a peer to peer network, e.g., a semi-autonomous peer to peer network, receive some control signaling from base stations in the WAN network to influence operation in the peer to peer network, e.g. influence the selection of connection identifiers in the peer to peer network. In various embodiments signaling from a WAN base station is used to aid in collision avoidance and/or collision detection in a peer to peer network.

In various peer to peer networks, if there are multiple peer to peer links, there is a need for a scheduling mechanism among links. One example of such a scheduling mechanism is connection scheduling in a peer to peer system using a peer to peer protocol including a recurring peer to peer timing structure. In some embodiments, to enable such scheduling mechanism each link is allocated a dedicated resource which the link uses for right to transmission contention. In some such embodiments, such dedicated resources are known as connection identifier (CID) resources. To obtain good performance from the scheduling mechanism it is desirable that these dedicated resources are locally unique, i.e., two links that have identical dedicated resources should be widely separated in distance. In some peer to peer networks, a CID broadcast mechanism is used to attempt to achieve adequate distance separation in allocation of CID.

Figure 6:
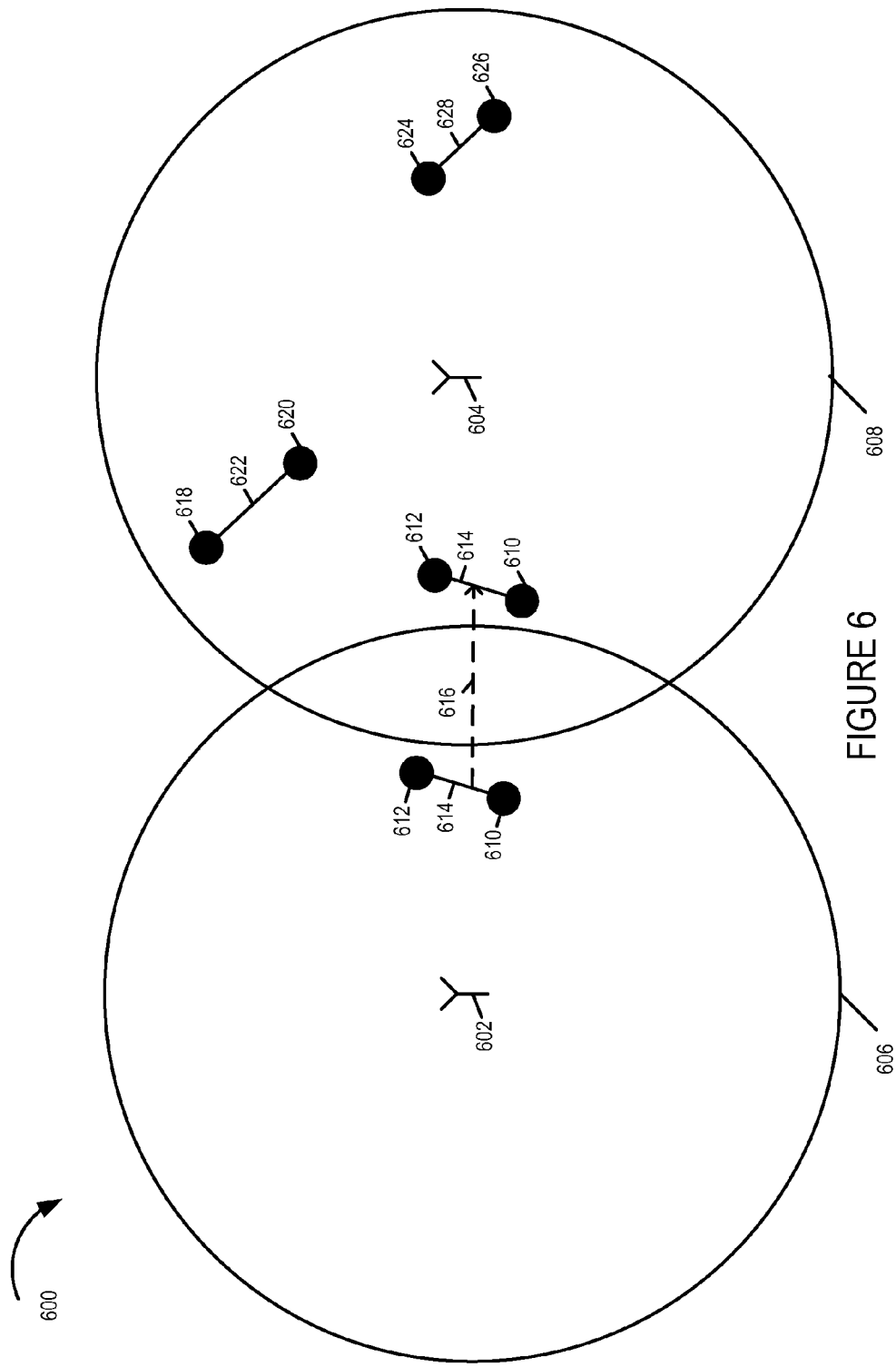
FIG. 6 illustrates two exemplary WAN base stations which monitor peer to peer activity within their coverage areas and influence the peer to peer network.

However due to mobility it is possible that two links that have the same dedicated resource might move close to each other. Drawing 600 of FIG. 6 illustrates two exemplary WAN base stations (base station 1 602, base station 2 604), with corresponding coverage areas (606, 608), respectively. The base stations (602, 604) monitor peer to peer activity within their coverage areas (606, 608) and influence the peer to peer network. In this example, there are three exemplary peer to peer links shown (link 1 610, link 2 612, link 3 614), where each peer to peer link (610, 612, 614) corresponds to a pair of mobile wireless communications devices ((616, 618), (620, 622), (624, 626)), respectively, using a peer to peer signaling protocol. In drawing 600 of FIG. 6 consider that link 2 612 has the same dedicated resource as link 1 610 and link 1 610 is moving closer to link 2 612, as indicated by dotted line arrow 616. This is not desirable and may result in a collision. To address this issue, a contention detection mechanism is implemented. One approach to achieve this is to allow devices to randomly listen on their own dedicated resource. If the received power on one's own resource is high then, in some embodiments, the device moves to another dedicated resource. One example of this is a CID broadcast mechanism where a device has the option of two blocks of resources to transmit on. In some embodiments, a device, with some probability, e.g., probability half, chooses to listen on one block and transmit on the other. In some embodiments, a wireless communications device, corresponding to a peer to peer link with a corresponding CID selects once which one of the two blocks to transmit on and which one of the two blocs to receive on, and then stays with the selection, e.g., for multiple iterations of the two blocks. In some other embodiments, a wireless communications device, corresponding to a peer to peer link with a corresponding CID selects which one of the two blocks to transmit on and which one of the two blocks to receive on for each iteration of the two blocks.

Figure 7:
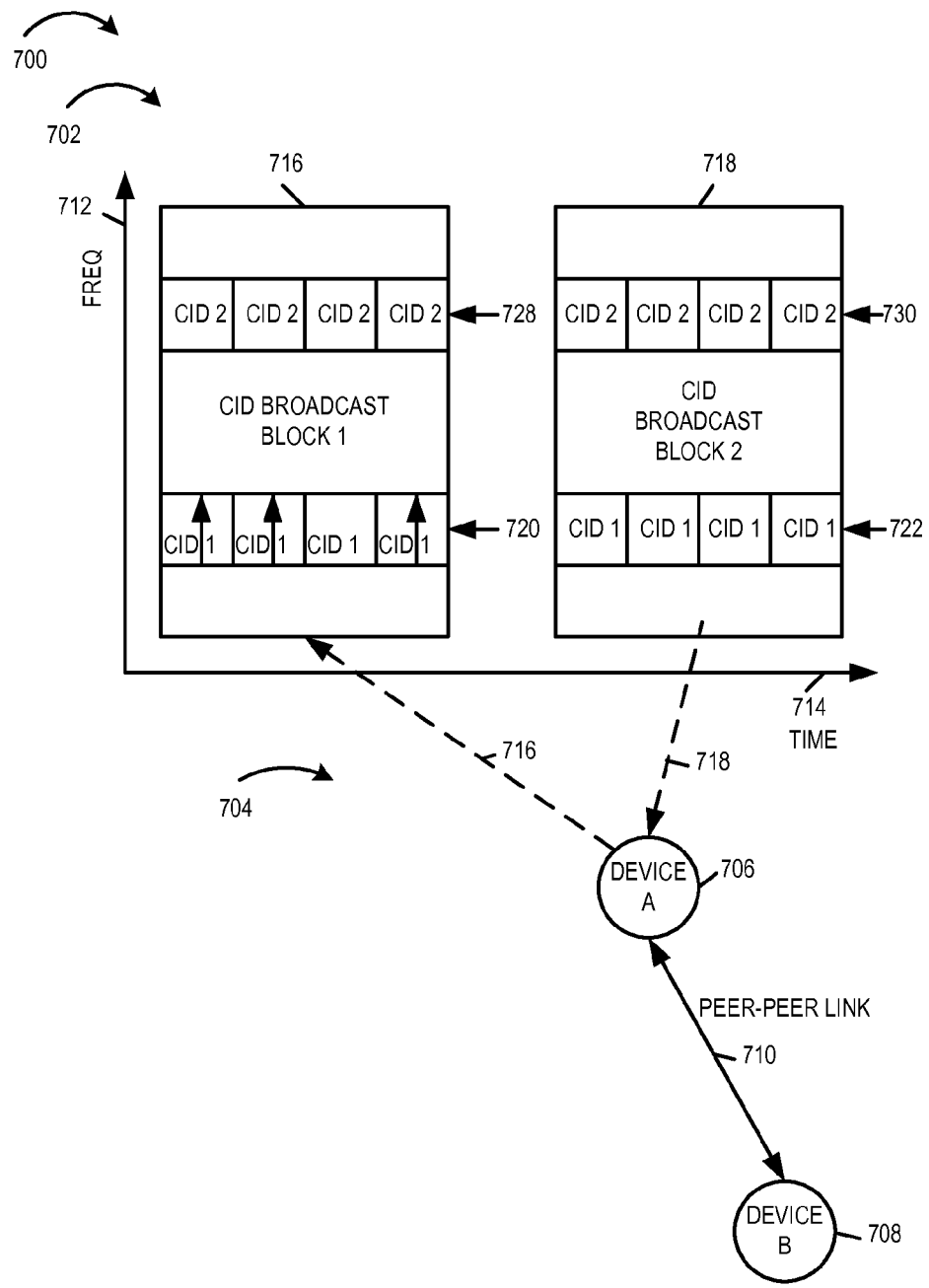
FIG. 7 illustrates an exemplary peer to peer wireless device broadcasting a peer to peer connection identifier signal into a first connection identifier resource block and monitoring a second connection identifier resource block in accordance with an exemplary embodiment.

Drawing 700 of FIG. 7 illustrates an exemplary time/frequency plot 702 and a drawing 704 of an exemplary pair of mobile wireless communications devices (device A 706, device B 708) which have a peer to peer link 710. Time frequency plot 702 includes a vertical axis 712 representing frequency and a horizontal axis 714 representing time. Block 1 716 and block 2 718 are air link resources dedicated to be used to carry broadcast CID information corresponding to peer to peer links. As part of peer to peer connection establishment, devices acquired a CID, which has a corresponding resources in block 1 and block 2. Devices (device A 706, device B 708) have acquired CID=1, with CID resource 720 in block 1 716 and resource 722 in block 2 718, which correspond to peer to peer link 710. In this example, resource 720 is a set of 4 OFDM tone-symbols in CID broadcast block 1 716, and resource 722 is a set of 4 OFDM tone-symbols in CID broadcast block 2 718.

In this example device A 706, is transmitting on resource 720 of block 1 716 as indicated by arrow 716, and listening on resource 722 of block 2 718, as indicated by arrow 718. In this example, device A 706 transmits on 3 of the 4 tone-symbols of resource 720, as indicated by the three tone-symbols of resource 720 including vertical arrows. In some other embodiments, device A 706 transmits on each of the tone-symbols of resource 720.

If the received power on the resource 722 of block 2 718, is high, e.g., above a predetermined threshold, then device A 706 can, and sometime does, switch its CID, e.g. to another CID such as the CID corresponding to the pair of resources (728, 730). In some embodiments, device A selects, e.g., pseudo-randomly, whether to: (i) transmit on block 1 and receive on block 2 or (ii) transmit on block 2 and receive on block 1. A random selection approach has a problem in that the chances of not detecting a collision between two devices that are in vicinity, corresponding to different links but using the same CID, are 50% in the example where a wireless device selects between the two alternatives with ½ probability, e.g., neither block is favored in the selection process. For example, consider that two pairs of links which were at one time widely separated, e.g., out of detection range of one another may have chosen the same CID, are now close to one another, e.g., within detection range, have each selected to transmit on resource 720 block 1 716 and receive on resource 722 of block 2 718. In such a scenario the two links would be unable to detect one another's broadcast CID transmission, and would interfere with one another, e.g., when the links try to transmit other signals such as traffic transmission control signals which may use air link resources which correspond to the CID. In some embodiments, resources used for some traffic transmission control signals such as traffic transmission request signals and traffic transmission request response signals, map to corresponding CIDs.

In various embodiments, a WAN assisted method is used to better facilitate collision detection and/or collision avoidance. Various features relate to contention detection of resources in peer to peer communications. In some embodiments, WAN assistance is used for contention detection and/or collision avoidance.

Consider that a base station is aware of the CID or dedicated resources assigned to peer to peer links in its cell. In some embodiments, wireless communications devices self-assign themselves links, e.g., a pair of wireless devices selects a CID resource that they perceive as unused in the local vicinity, when establishing the peer to peer link. In some embodiments, the dedicated resource acts as an identifier for the link, e.g., power on the dedicated resource indicates that an in-use link corresponds to that resource, and if the WAN knows the dedicated resource, it can, and sometimes does, control some aspect of the peer to peer communication and/or track the performance of the link. Then if a new peer to peer link moves into the base station's cell and has the same dedicated resource as one of the peer to peer links in the cell, which is already in use, then there is a possibility of a collision.

Consider with respect to FIG. 6 that link 1 614 is moving into the cell 608 containing link 2 622 and 3 628. Further consider that link 1 614 and link 2 622 have the same dedicated resource, e.g., the same CID.

In some embodiments, the base station 604 resolves the collision by instructing one of the links (614, 622) to change their CID. For example, base station 604 sends a message to one or more of devices (610, 612) instructing the devices (610, 612) to change to a different CID. In some embodiments cells can have a relatively large cellular coverage area in comparison to the unacceptable interference distance between links in a peer to peer network operating within the cell. In some such embodiments, two peer to peer links within the same cell can, and sometime do, have the same dedicated resource. For example in FIG. 6, consider that cell 608 is such a cell, it may be ok for link 1 614 and 3 628 to have the same dedicated resources, e.g., same CID provided there is a wide enough distance separation between the links. In some embodiments, the decision to directly resolve the collision or not is based on cell size, e.g., for cells above a predetermined size, the base station resolves potential peer to peer collisions by sending a message commanding a wireless device to change links. In some embodiments, the decision to directly resolve the collision or not is based on proximity between links using the same CID. In some embodiments, the base station tracks the location of peer to peer devices within its cell and makes a decision as to whether or not command a device to change its CID as a function of separation between links detected to be using the same CID. For example, in some embodiments, for a base station to send a command to a wireless device commanding the wireless device to change to another CID the two links detected by the base station to be using the same CID are detected to be separated by a distance below a predetermined threshold.

In some embodiments, if the base station does not resolve the collision, e.g., by commanding a device to change its CID, the base station can improve the odds of links detecting a collision. In some embodiments, this is performed by the base station sending a message to one or more devices of either one or both the links asking the device associated with a link to bias the randomness with which they choose a block to transmit on and listen to. Continuing with the example in the FIG. 6 the base station 604 can, and sometimes does, ask one or more of device 610 and device 612, associated with link 1 614, to transmit on block 1 and listen on block 2 with probability 0.9 and do the vice versa i.e., transmit on block 2 and listen on block 1, with probability 0.1. Similarly the base station 604 can, and sometimes does, ask one or more of device 620 and device 618, associated with link 2 622, to transmit on block 1 and listen on block 2 with probability 0.1 and do the vice versa, i.e., transmit on block 2 and listen on block 1, with probability 0.9. This increases the odds of collision detection to more than 80%. Thus the base station 604 has increased the likelihood for rapid collision detection by two pairs of links using the same CID within its cell, which may come into close proximity.

In some embodiments, for small size cells, e.g., below a first predetermined limit, a base station tracks peer to peer connections using the same CID and sends commands to devices to switch CIDs; and for larger size cells, e.g., above the first predetermined limit, a base station tracks peer to peer connections using the same CID and send messages to devices to change probability weights with regard to which peer discovery block to transmit into and which peer discovery block to receive into. In some embodiments, the base station tracks peer to peer connections, tracks device locations of devices corresponding to the peer to peer connections, and identifies connections using the same CID. In some such embodiments, base station makes decisions as to when to send commands to change CIDs or change probability weights corresponding to transmitting/receiving in different CID blocks, as a function of: one or more of the range between two connections using the same CID, the change in the range of the proximity between the two connections using the same CID, the rate of change in the range of proximity between the two connections using the same CID, and the peer to peer communications protocol type. In some embodiments, different peer to peer communications protocols may be used which have different peer to peer communications ranges and/or different interference characteristics. In some embodiments, in which a base station sends a command for one link in a pair of links using the same CID to change its CID, the base station selects the link as a function of one or more of: priority information, level of service information, and amounts of data to be transmitted, e.g., selecting to change the link of the devices having the lower priority, lower level of service and/or lower amounts of peer to peer traffic data.

In some embodiments, a base station uses different approaches for different peer to peer communications protocols which may be used within its cell. For example, assume that a base station has determined that multiple pairs of devices within its coverage area are using the same peer to peer CID. In some embodiments, the base station sends a command to switch peer to peer CID to perform collision avoidance for a first type of peer to peer protocol, and the base station sends information to bias use of connection signaling transmission resources among alternatives, e.g., changing weighing probabilities with regard to selection of which of the alternatives to use for transmission and which to use for reception, to increase the probability of collision detection for a second type of peer to peer protocol.

In some embodiments, adjacent base stations are coupled together via a backhaul network. In some such embodiments, adjacent base stations, which are tracking peer to peer activity within their cell including tracking the usage of connection identifiers, interchange information, e.g., notifying each of the peer to peer connections in use within their cells and/or notifying each other of connections and associated CIDs which are moving into the adjacent cell. In some embodiments, peer to peer device location information and/or connection locations information is also interchanged between the adjacent base stations.

Thus in some embodiments, the tracking of connection identifier usage includes tracking information obtained by monitored peer to peer wireless transmissions and information obtained indirectly from another base station.

Figure 8:
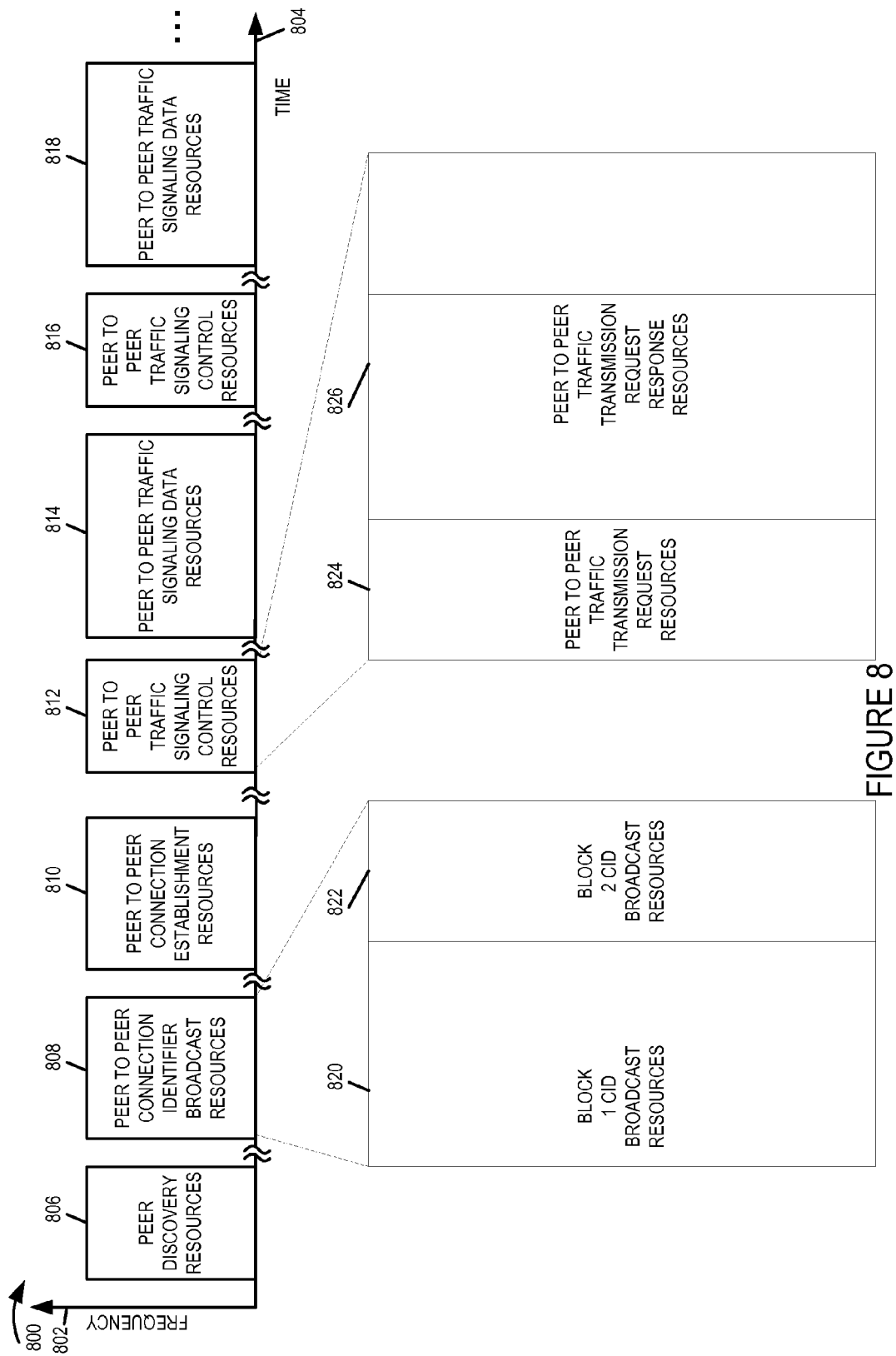
FIG. 8 is a drawing of an exemplary recurring peer to peer frequency-time structure in accordance with various embodiments.

FIG. 8 is a drawing 800 of an exemplary recurring peer to peer frequency-time structure in accordance with various embodiments. Vertical axis 802 represents frequency, while horizontal axis 804 represents time. Exemplary peer to peer frequency-time structure include peer discovery resources 806, peer to peer connection identifier broadcast resources 808, peer to peer connection establishment resources 810, peer to peer traffic signaling control resources 812, peer to peer traffic signaling data resources 814, peer to peer traffic signaling control resources 816 and peer to peer traffic signaling data resources 818. Peer discovery resources 806 include air link resources for peer to peer devices to transmit, e.g., broadcast, peer discovery signals, which may be detected by other peer to peer devices in its vicinity. Peer to peer connection identifier broadcast resources 808 includes air link resources which are used by devices which have an existing peer to peer connection to broadcast a signal indicating that they are using a particular peer to peer connection identifier.

Peer to peer connection identifier broadcast resources 808 includes two blocks of resources, block 1 CID broadcast resources 820 and block 2 CID broadcast resources 822. For each connection identifier there is a corresponding set of resources in each of the two blocks (820, 822). Peer to peer wireless devices, corresponding to an existing connection, select one of the two alternative blocks to use for transmission for a particular iteration, and use the other one of the two blocks for listening. The selection between the two blocks may, and sometimes does, vary over time. In various embodiments, there is a degree of randomness associated with the selection between the two blocks. In some embodiments, the selection probabilities are a function of a controlled weighting value which may, and sometimes does change, e.g., under base station control. Thus two connections, in the same vicinity, using the same connection identifier would eventually hear each other's CID broadcasts and recognize that there is a collision condition, e.g., when the transmission by the two connections corresponding to different blocks. In various embodiments, the structure of using two blocks and the characteristics of the CID transmission signals facilitate rapid recognition of CID collision by a base station which may be monitoring the CID transmission in both blocks (820, 822). In various embodiments, the base station can detect CID broadcast from peer to peer devices over a larger range than a peer to peer device can detect CID broadcast signals from other peer to peer devices. In various embodiments, some CID signals include a NULL tone, which may be, and sometimes is, different for different pairs of connections using the same CID. In some embodiments, signal characteristics, e.g., phase, may be, and sometimes is different for CID signals, coming from different connections using the same CID. Thus, in some such embodiments, a base station may be able to quickly identify that two peer to peer connections are using the same CID, even when they transmit on the same block, e.g., both transmit on the same set of resources corresponding to the same CID within block 1 820.

Peer to peer connection establishment resources 810 includes resources used for selecting and confirming a CID to use for a new connection. In some embodiments, a pair of peer to peer devices which wants to establish a new peer to peer connection performs a negotiation process to select a CID. Each of the devices has monitored the CID broadcast resources 808 and identified CIDs that are currently in use from their own perspectives. The devices then select a CID which both devices perceive as being unused. In the next iteration of the peer to peer connection identifier broadcast resources 808, the device which have selected the new CID with broadcast into one of the two blocks (820, 822) announces that they are using the CID which they selected.

Peer to peer traffic signaling control resources 812 correspond to peer to peer traffic signaling data resources 814. The peer to peer traffic signaling data resources 814 includes one or more peer to peer traffic data segments, for which the peer to peer connections compete to use. Peer to peer traffic signaling control resources 812 include peer to peer traffic signaling transmission request resources 824 and peer to peer traffic transmission request response resources 826. Peer to peer traffic signaling control resources 816 correspond to peer to peer traffic signaling data resources 818. In some embodiments, there are additional pairs of peer to peer traffic signaling control resources and corresponding peer to peer traffic signaling data resources for one iteration of the recurring peer to peer structure.

Figure 9:
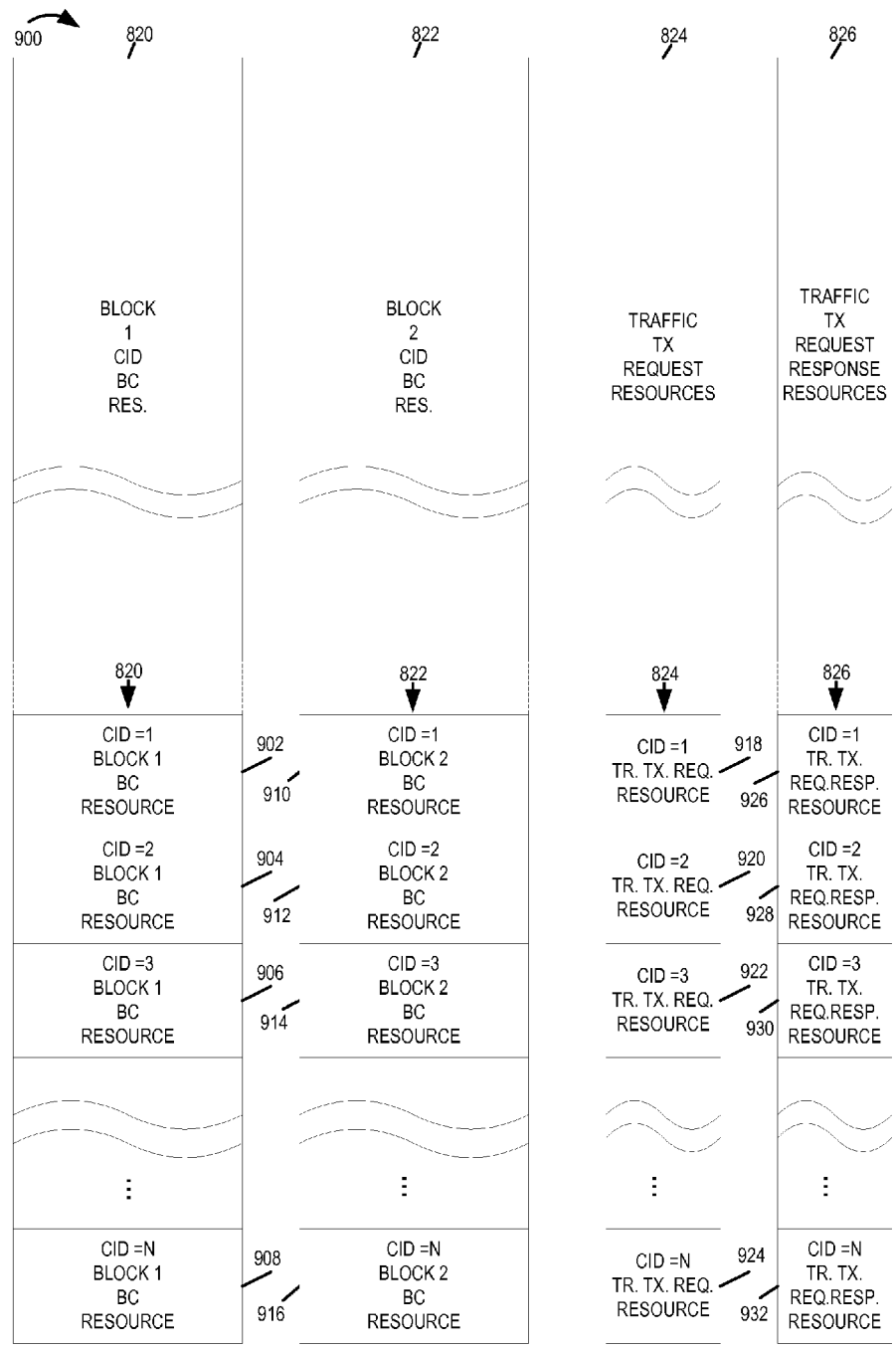
FIG. 9 is a drawing illustrating further partitioning of: the peer to peer connection identifier broadcast resource blocks, the traffic transmission request resources, and the traffic transmission request response resources of FIG. 8 in accordance with an exemplary embodiment.

FIG. 9 is a drawing 900 illustrating further partitioning of: the peer to peer connection identifier broadcast resources blocks (820, 822), the traffic transmission request resources 824, and the traffic transmission request response resources 826. Block 1 CID broadcast resources 820 includes resources corresponding to each of the CIDs used in the peer to peer network (CID=1 block 1 broadcast resource 902, CID=2 block 1 broadcast resource 904, CID=3 block 1 broadcast resources 906, . . . , CID=N block 1 broadcast resource 908). Block 2 CID broadcast resources 822 includes resources corresponding to each of the CIDs (CID=1 block 2 broadcast resource 910, CID=2 block 2 broadcast resource 912, CID=3 block 2 broadcast resources 914, . . . , CID=N block 2 broadcast resource 916). Note that for each peer to peer connection identifier (CID) there is a resource in block 1 820 and a resource in block 2 822.

Traffic transmission request resources 824 includes resources corresponding to each of the CIDs (CID=1 traffic transmission request resources 918, CID=2 traffic transmission request resource 920, CID=3 traffic transmission request resource 922, . . . , CID=N traffic transmission request resources 924). A traffic transmission request resource corresponding to a connection identifier may be used by a device in the pair of devices which has acquired the connection identifier to transmit a peer to peer traffic transmission request signal to the other device in the pair.

Traffic transmission request response resources 826 includes resources corresponding to each of the CIDs (CID=1 traffic transmission request response resource 926, CID=2 traffic transmission request response resource 928, CID=3 traffic transmission request response resource 930, . . . , CID=N traffic transmission request response resource 932). A traffic transmission request response resource corresponding to a connection identifier may be used by a device in the pair of devices which has acquired the connection identifier and has received a traffic transmission request signal, from the other device in the pair, to respond and transmit a peer to peer traffic transmission request response signal, e.g., acquiesce to the request or deny the request.

In the exemplary embodiment, a wireless communications device which has a peer to peer connection transmits during one of the CID blocks and monitors during the other one of the CID blocks. For example consider that a mobile wireless terminal has a peer to peer connection corresponding to CID=2. The mobile wireless device either transmits on resource 904 and monitors on resource 912, or the mobile wireless device transmits on resource 912 and monitors on resource 904.

In this exemplary embodiment, there are corresponding dedicated traffic transmission request resources and traffic transmission request response resources corresponding to each connection identifier. Therefore, if two pairs of devices are using the same connection ID in a local region and are unaware of each other a collision may, and sometimes does, occur on the traffic transmission request resources and traffic transmission request response resources. It is desirable that pairs of devices using the same connection identifier which happen to move within close proximity of one another, e.g., close enough to interfere with one another, become aware of the potential collision as soon as possible.

Figure 10:
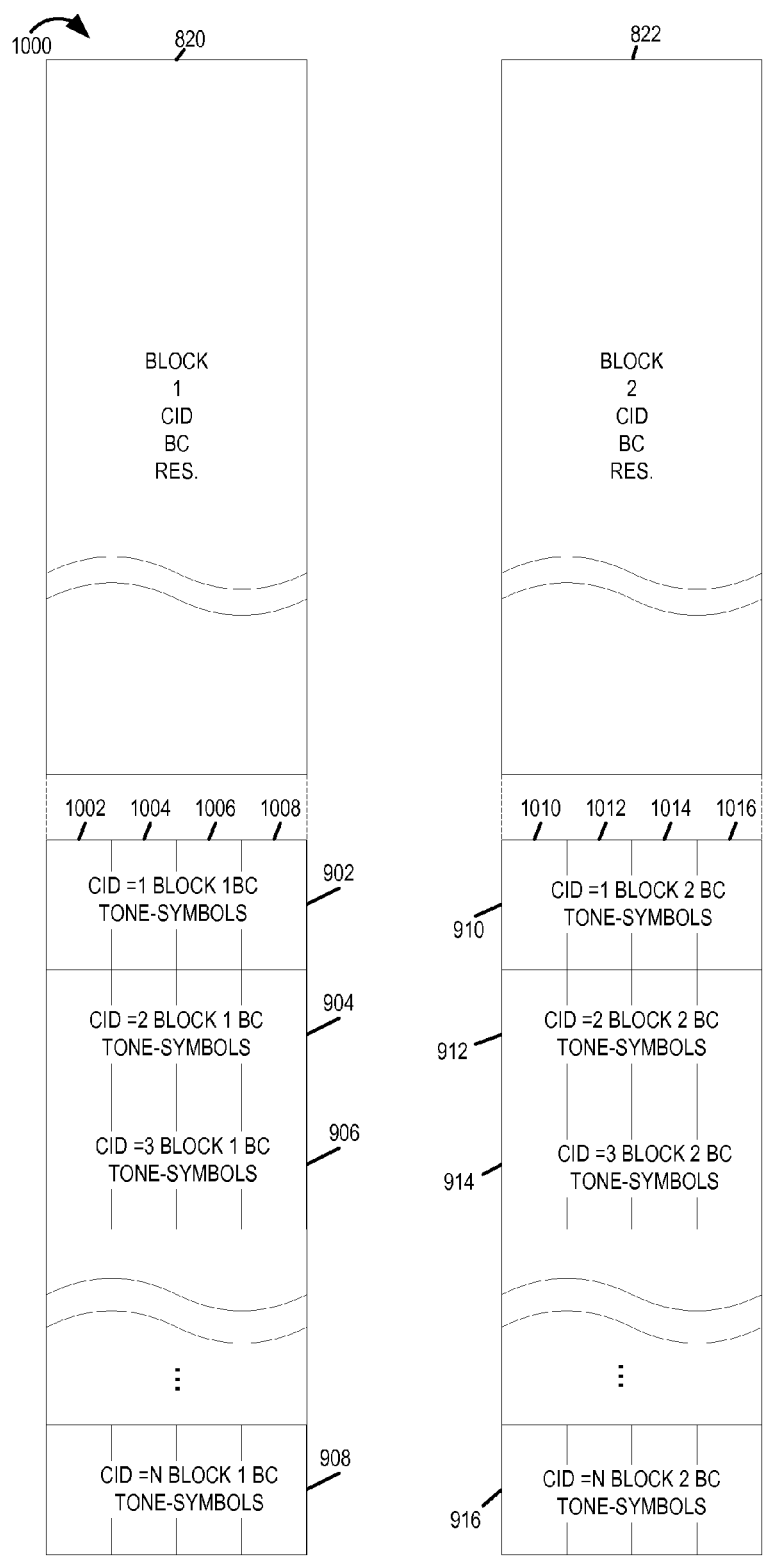
FIG. 10 is a drawing illustrating further partitioning of the peer to peer connection identifier broadcast resource blocks of FIG. 8 in which each broadcast resource corresponding to a connection identifier in a block includes a set of tone-symbols in accordance with an exemplary embodiment.

FIG. 10 is a drawing 1000 illustrating further partitioning of the peer to peer connection identifier broadcast resources blocks (820, 822) in accordance with some embodiments. In this example, each broadcast resource corresponding to a CID in a block includes a set of four tone-symbols. For example, CID=1 block 1 broadcast resource 902 includes tone-symbols 1002, 1004, 1006, 1008, where each tone-symbols is one tone for one OFDM symbol transmission time period. As another example, CID=1 block 2 broadcast resource 910 includes tone-symbols 1010, 1012, 1014, 1016.

Figure 11:
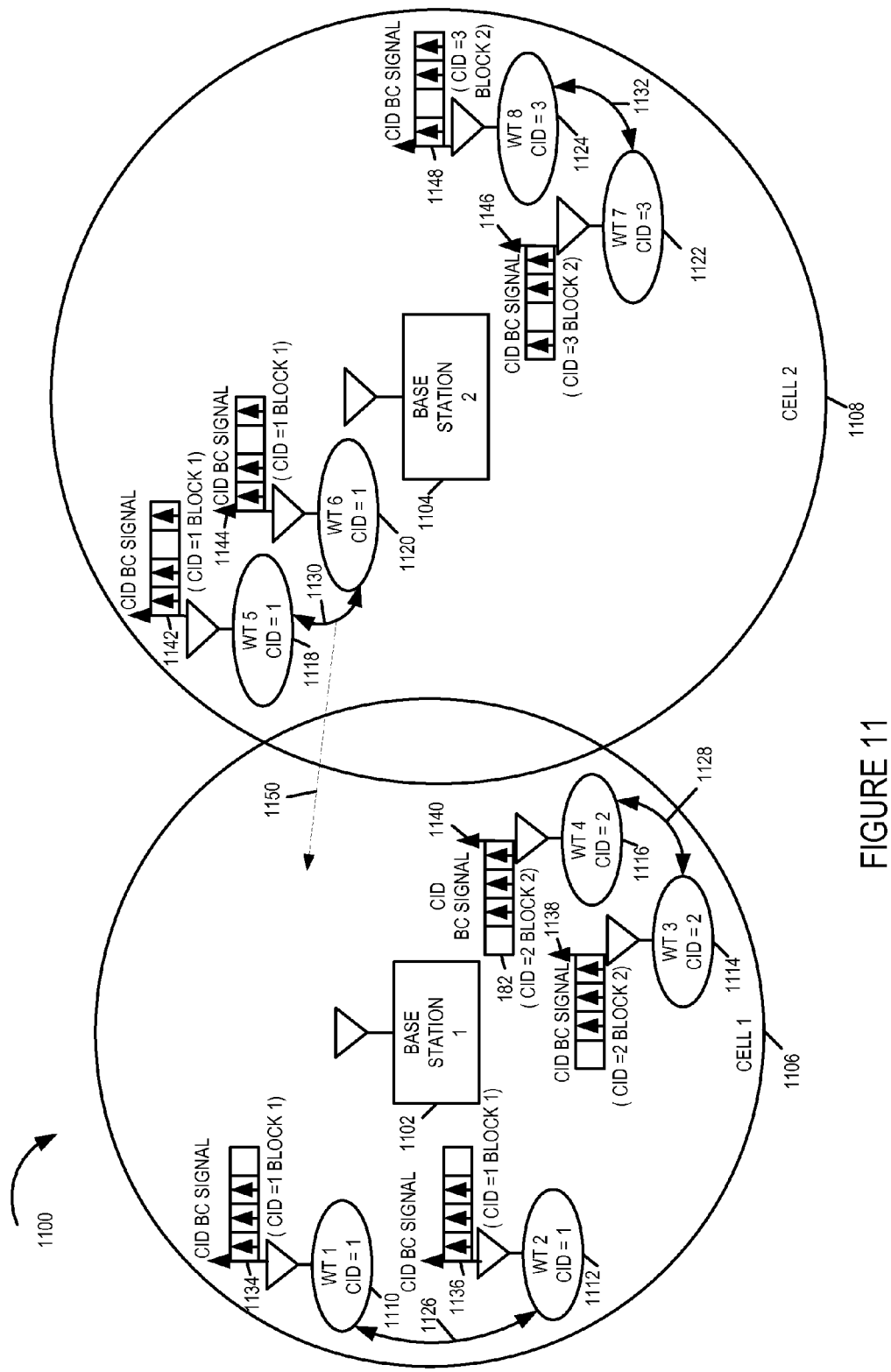
FIG. 11 is a first drawing in a sequence of drawings which illustrates an example in which a base station tracks usage of peer to peer connection identifiers by pairs of communications devices, detects multiple pairs of communications devices within its coverage area using the same connection identifier, and performs an operation to reduce the risk of collisions.

FIGS. 11-15 illustrate an example, in accordance with some embodiments, in which a base station tracks usage of connection identifiers by pairs of communications devices, detects multiple pairs of communications devices within its coverage area using the same connection identifier, and performs an operation to reduce the risk of collisions. FIG. 11 is a drawing illustrating two adjacent base stations (base station 1 1102, base station 2 1104), with corresponding coverage areas (cell 1 1106, cell 2 1108), respectively. Within cell 1 1106 there are a plurality of mobile wireless terminals using peer to peer communications (WT 1 1110, WT 2 1112, WT 3 1114, WT 4 1116). Within cell 2 1108 there are a plurality of mobile wireless terminals using peer to peer communications (WT 5 1118, WT 6 1120, WT 7 1122, WT 8 1124). Consider that the peer to peer wireless communications system is using a recurring frequency timing structure in accordance with FIGS. 8-10. The base stations (1102, 1104) are, e.g., any of the base stations of system 100 of FIG. 1. The base stations are (1102, 1104) implement a method in accordance with flowchart 200 of FIG. 2 and/or are implemented in accordance with FIG. 3 and/or FIG. 4. The wireless terminals (1110, 1112, 1114, 1116, 1118, 1110, 1120, 1122, 1124) are, e.g., any of the peer to peer wireless terminals of system 100 of FIG. 2.

WT 1 1110 and WT 2 1112 have peer to peer connection 1126 and are using CID=1 corresponding to their connection 1126. WT 3 1114 and WT 4 1116 have peer to peer connection 1128 and are using CID=2 corresponding to their connection 1128. WT 5 1118 and WT 6 1120 have peer to peer connection 1130 and are using CID=1 corresponding to their connection 1130. WT 7 1122 and WT 8 1124 have peer to peer connection 1132 and are using CID=3 corresponding to their connection 1132.

WT 1 1110, has selected use CID block 1 for transmission and transmits CID broadcast signal 1134 on CID=1 block 1 resource. In this example, CID broadcast signal 1134 includes energy on the first three tone-symbols of CID=1 block 1 resource. WT 2 1112, has selected use CID block 1 for transmission and transmits CID broadcast signal 1136 on CID=1 block 1 resource. In this example, CID broadcast signal 1136 includes energy on the first three tone-symbols of CID=1 block 1 resource.

WT 3 1114, has selected use CID block 2 for transmission and transmits CID broadcast signal 1138 on CID=2 block 2 resource. In this example, CID broadcast signal 1138 includes energy on the last three tone-symbols of CID=2 block 2 resource. WT 4 1116, has selected use CID block 2 for transmission and transmits CID broadcast signal 1140 on CID=2 block 2 resource. In this example, CID broadcast signal 1140 includes energy on the last three tone-symbols of CID=2 block 2 resource.

WT 5 1118, has selected use CID block 1 for transmission and transmits CID broadcast signal 1142 on CID=1 block 1 resource. In this example, CID broadcast signal 1142 includes energy on the first, second and fourth tone-symbols of CID=1 block 1 resource. WT 6 1120, has selected use CID block 1 for transmission and transmits CID broadcast signal 1144 on CID=1 block 1 resource. In this example, CID broadcast signal 1144 includes energy on the first, second and fourth tone-symbols of CID=1 block 1 resource.

WT 7 1122, has selected use CID block 2 for transmission and transmits CID broadcast signal 1146 on CID=3 block 2 resource. In this example, CID broadcast signal 1146 includes energy on the first, third and fourth tone-symbols of CID=3 block 2 resource. WT 8 1124, has selected use CID block 2 for transmission and transmits CID broadcast signal 1148 on CID=3 block 2 resource. In this example, CID broadcast signal 1148 includes energy on first, third and fourth tone-symbols of CID=3 block 2 resource.

At this time there is no conflict between peer to peer connection identifier usage. However, WT 5 1118 and WT 6 1120 with their corresponding peer to peer connection 1130 are moving from cell 2 1108 to cell 1 1106 as indicated by arrow 1150.

Figure 12:
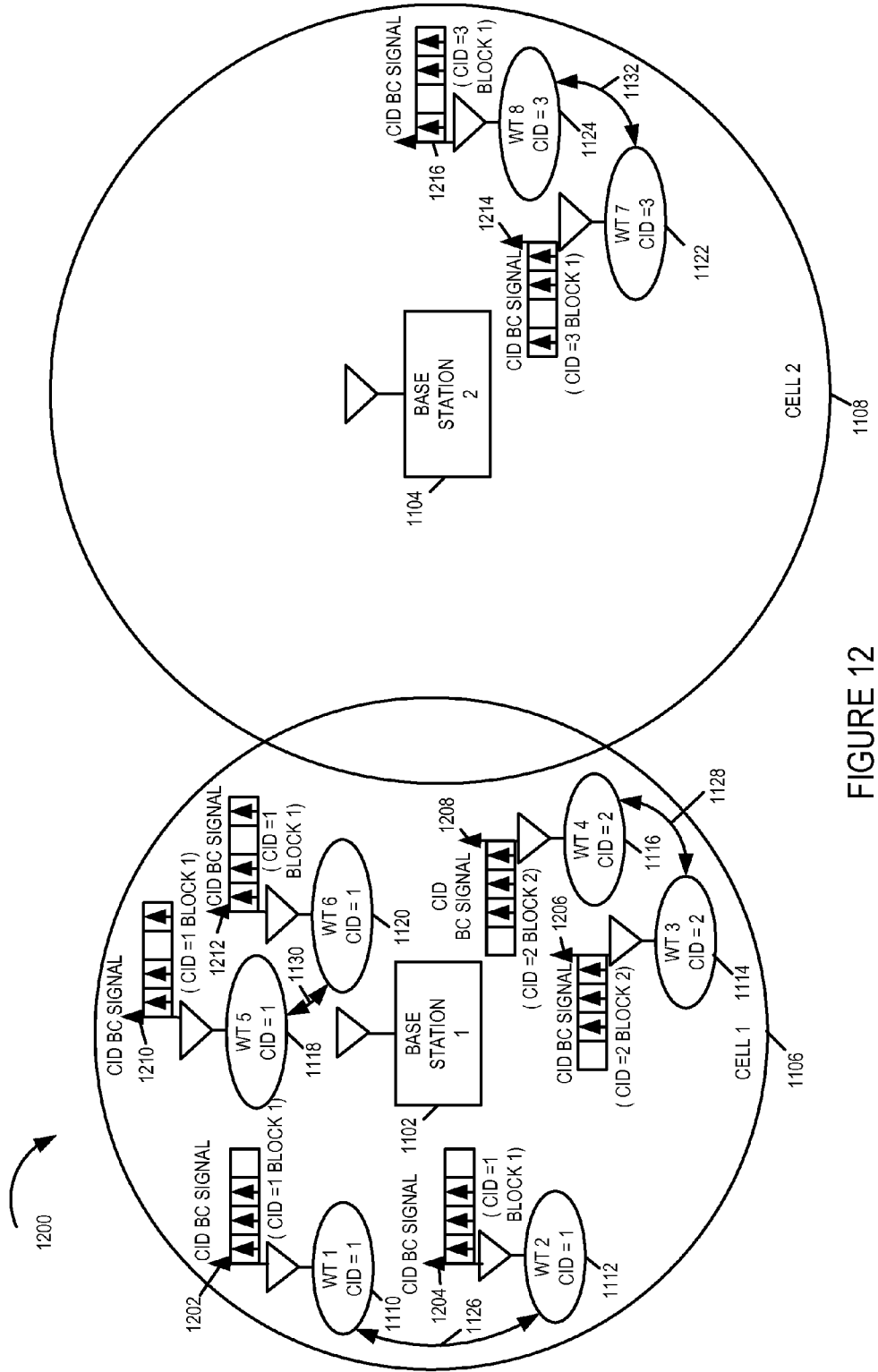
FIG. 12 is a second drawing in a sequence of drawings which illustrates an example in which a base station tracks usage of peer to peer connection identifiers by pairs of communications devices, detects multiple pairs of communications devices within its coverage area using the same connection identifier, and performs an operation to reduce the risk of collisions.

FIG. 12 is a drawing 1200 illustrating exemplary signaling at a time following the sequence of events describes with respect to FIG. 11. In FIG. 12, wireless terminal 5 1118 and wireless terminal 6 1120 with connection 1130 are now located in cell 1 1106.

WT 1 1110, has selected use CID block 1 for transmission and transmits CID broadcast signal 1202 on CID=1 block 1 resource. In this example, CID broadcast signal 1202 includes energy on the first three tone-symbols of CID=1 block 1 resource. WT 2 1112, has selected use CID block 1 for transmission and transmits CID broadcast signal 1204 on CID=1 block 1 resource. In this example, CID broadcast signal 1204 includes energy on the first three tone-symbols of CID=1 block 1 resource.

WT 3 1114, has selected use CID block 2 for transmission and transmits CID broadcast signal 1206 on CID=2 block 2 resource. In this example, CID broadcast signal 1206 includes energy on the last three tone-symbols of CID=2 block 2 resource. WT 4 1116, has selected use CID block 2 for transmission and transmits CID broadcast signal 1208 on CID=2 block 2 resource. In this example, CID broadcast signal 1208 includes energy on the last three tone-symbols of CID=2 block 2 resource.

WT 5 1118, has selected use CID block 1 for transmission and transmits CID broadcast signal 1210 on CID=1 block 1 resource. In this example, CID broadcast signal 1210 includes energy on the first, second and fourth tone-symbols of CID=1 block 1 resource. WT 6 1120, has selected use CID block 1 for transmission and transmits CID broadcast signal 1212 on CID=1 block 1 resource. In this example, CID broadcast signal 1212 includes energy on the first, second and fourth tone-symbols of CID=1 block 1 resource.

WT 7 1122, has selected use CID block 1 for transmission and transmits CID broadcast signal 1214 on CID=3 block 1 resource. In this example, CID broadcast signal 1214 includes energy on the first, third and fourth tone-symbols of CID=3 block 1 resource. WT 8 1124, has selected use CID block 1 for transmission and transmits CID broadcast signal 1216 on CID=3 block 1 resource. In this example, CID broadcast signal 1216 includes energy on first, third and fourth tone-symbols of CID=3 block 1 resource.

Figure 13:
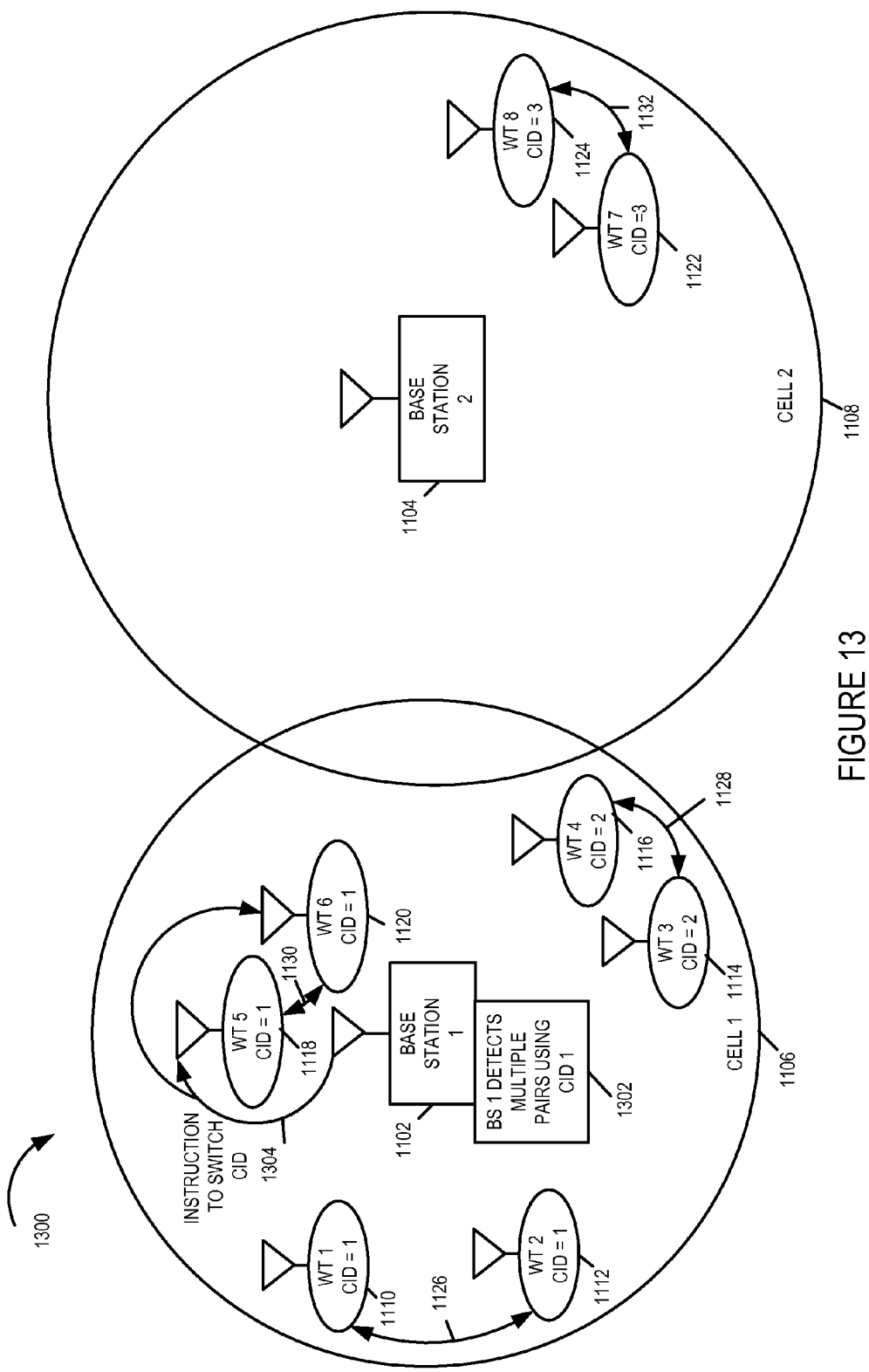
FIG. 13 is a third drawing in a sequence of drawings which illustrates an example in which a base station tracks usage of peer to peer connection identifiers by pairs of communications devices, detects multiple pairs of communications devices within its coverage area using the same connection identifier, and performs an operation to reduce the risk of collisions.

The base stations (1102, 1104) have been tracking the use of CIDs in their coverage areas. Tracking the use of CIDs includes monitoring the CID broadcast signals from the peer to peer wireless terminals. Drawing 1300 of FIG. 13 illustrates that base station 1 1102 detects multiple pairs of devices using the same peer to peer connection identifier in its coverage region and performs an operation to reduce the risk of collisions in the peer to peer network. Block 1302 indicates that base station 1 1102 has detected multiple pairs of peer to peer device using CID=1. WT 1 1110 and WT 2 1112 with connection 1126 are using CID=1; WT 5 1118 and WT 6 1120 with connection 1130 are also using CID=1. Base station 1 1102 generates and transmits signal 1304 to WT 5 1118 and WT 6 1120 instruction WT 5 1118 and WT 6 1120 to change their connection identifier. In some embodiments, signal 1304 includes information identifying the new CID to use. In some embodiments, signal 1304 does not identify a specific identifier to use, and WT 5 1118 and WT 6 1120 determine on their own, e.g., via monitoring CID broadcast signals during both blocks 1 and 2, which CID are available and then select a CID that is not currently in use.

Figure 14:
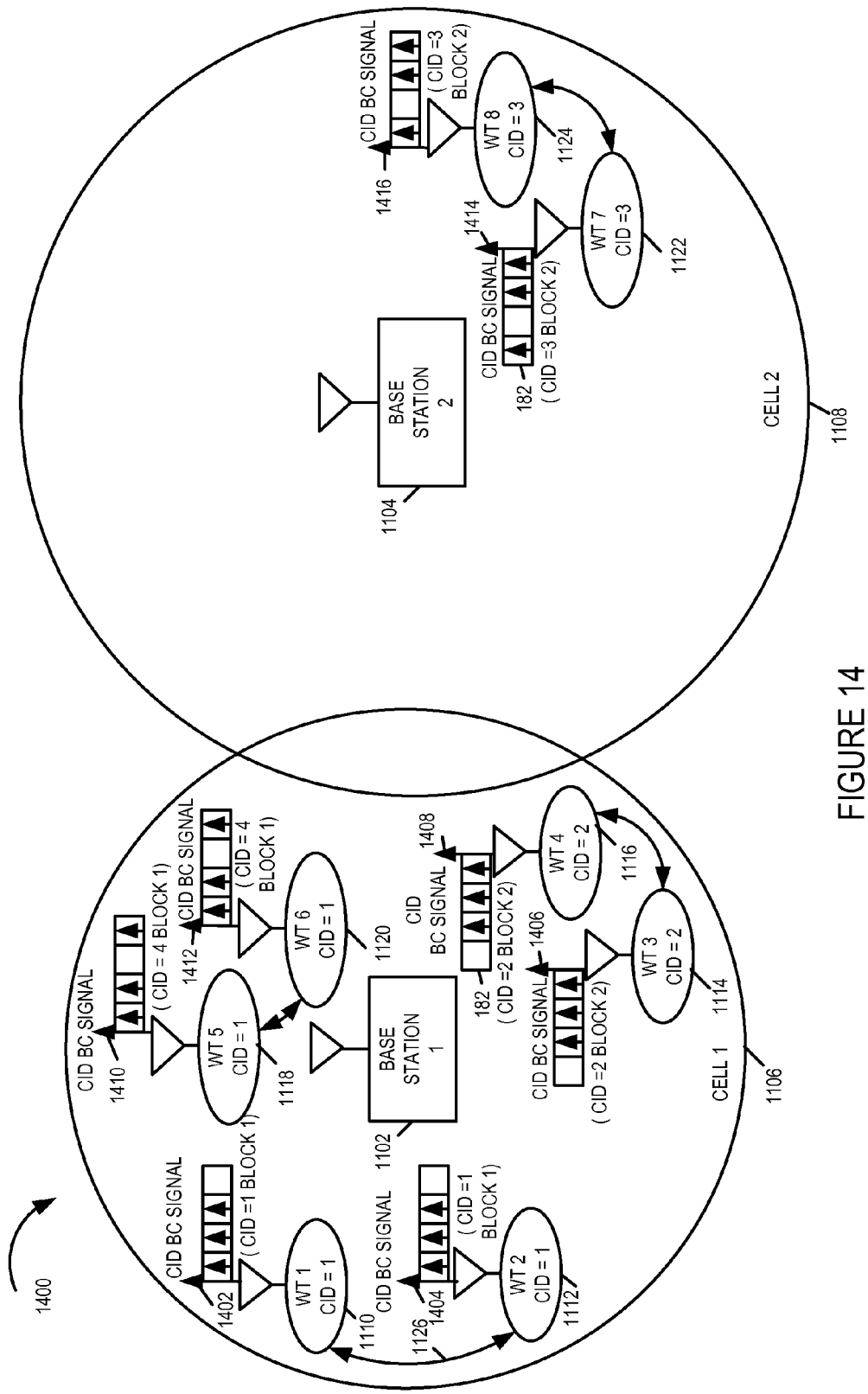
FIG. 14 is a fourth drawing in a sequence of drawings which illustrates an example in which a base station tracks usage of peer to peer connection identifiers by pairs of communications devices, detects multiple pairs of communications devices within its coverage area using the same connection identifier, and performs an operation to reduce the risk of collisions.

FIG. 14 is a drawing 1400 illustrating that WT 5 1118 and WT 6 1120 have switched to a new CID in response to signal 1304 from base station 1. In particular WT 5 1118 and WT 6 1120 have switched to CID=4. There is no longer a collision situation in the peer to peer network in cell 1 1106.

WT 1 1110, has selected use CID block 1 for transmission and transmits CID broadcast signal 1402 on CID=1 block 1 resource. In this example, CID broadcast signal 1402 includes energy on the first three tone-symbols of CID=1 block 1 resource. WT 2 1112, has selected use CID block 1 for transmission and transmits CID broadcast signal 1404 on CID=1 block 1 resource. In this example, CID broadcast signal 1404 includes energy on the first three tone-symbols of CID=1 block 1 resource.

WT 3 1114, has selected use CID block 2 for transmission and transmits CID broadcast signal 1406 on CID=2 block 2 resource. In this example, CID broadcast signal 1406 includes energy on the last three tone-symbols of CID=2 block 2 resource. WT 4 1116, has selected use CID block 2 for transmission and transmits CID broadcast signal 1408 on CID=2 block 2 resource. In this example, CID broadcast signal 1408 includes energy on the last three tone-symbols of CID=2 block 2 resource.

WT 5 1118, has selected use CID block 1 for transmission and transmits CID broadcast signal 1410 on CID=4 block 1 resource. In this example, CID broadcast signal 1410 includes energy on the first, second and fourth tone-symbols of CID=4 block 1 resource. WT 6 1120, has selected use CID block 1 for transmission and transmits CID broadcast signal 1412 on CID=4 block 1 resource. In this example, CID broadcast signal 1412 includes energy on the first, second and fourth tone-symbols of CID=4 block 1 resource.

WT 7 1122, has selected use CID block 3 for transmission and transmits CID broadcast signal 1414 on CID=3 block 2 resource. In this example, CID broadcast signal 1414 includes energy on the first, third and fourth tone-symbols of CID=3 block 2 resource. WT 8 1124, has selected use CID block 2 for transmission and transmits CID broadcast signal 1416 on CID=3 block 2 resource. In this example, CID broadcast signal 1416 includes energy on first, third and fourth tone-symbols of CID=3 block 2 resource.

Figure 15:
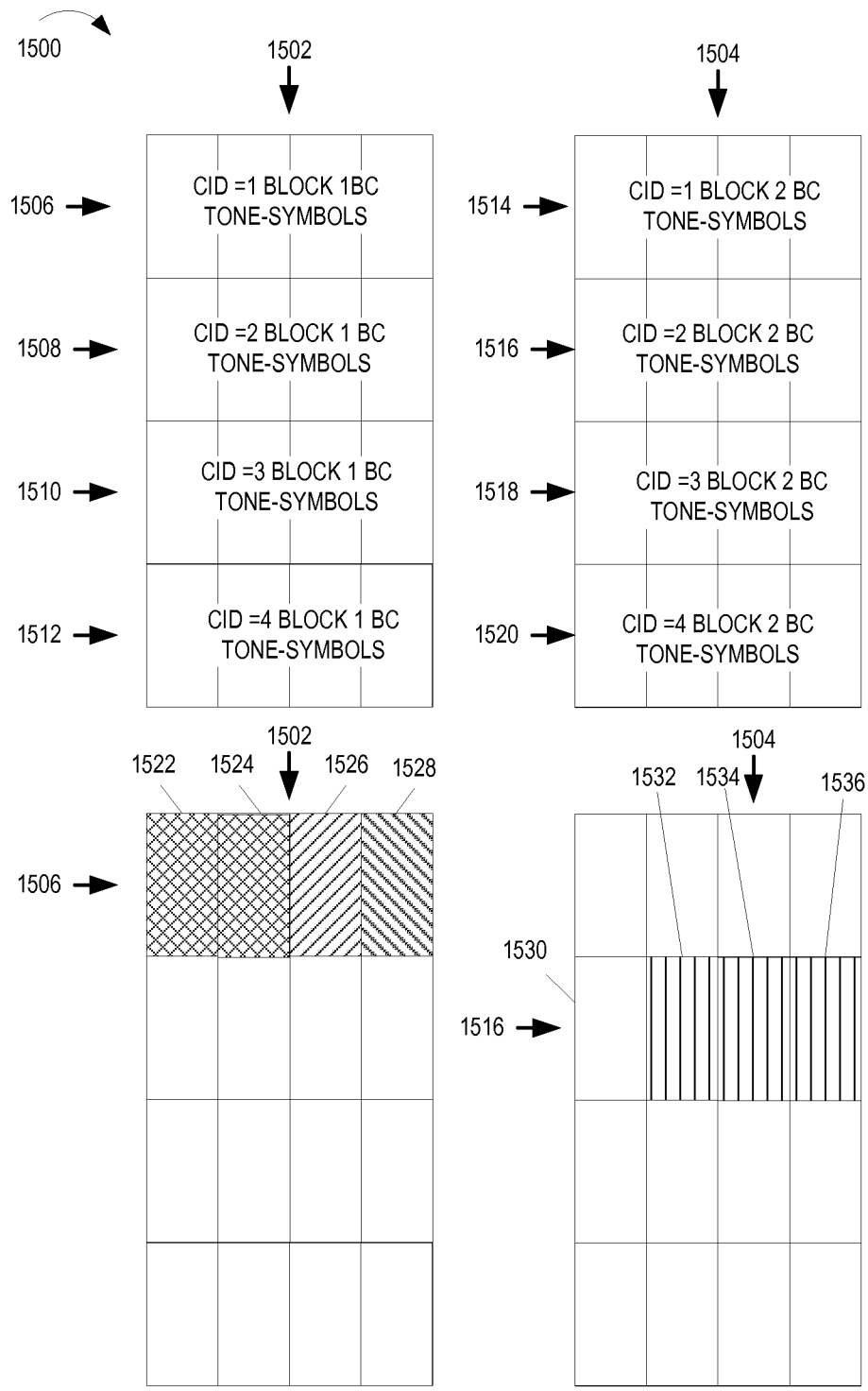
FIG. 15 is a fifth drawing in a sequence of drawings which illustrates an example in which a base station tracks usage of peer to peer connection identifiers by pairs of communications devices, detects multiple pairs of communications devices within its coverage area using the same connection identifier, and performs an operation to reduce the risk of collisions.

FIG. 15 includes drawing 1500 illustrating a portion of CID resources block 1 1502 which corresponds to CIDs 1-4 and a portion of CID resource block 2 1504 which corresponds to CIDs 1-4. CID resource block 1 portion 1502 includes: CID=1 block 1 resource 1506 which includes four tone-symbols, CID=2 block 1 resource 1508 which includes four tone-symbols, CID=3 block 1 resource 1510 which includes four tone-symbols, and CID=4 block 1 resource 1512 which includes four tone-symbols. CID resource block 2 portion 1504 includes: CID=1 block 2 resource 1514 which includes four tone-symbols, CID=2 block 2 resource 1516 which includes four tone-symbols, CID=3 block 2 resource 1518 which includes four tone-symbols, and CID=4 block 2 resource 1520 which includes four tone-symbols.

Drawing 1500 of FIG. 15 is used to represent transmission into CID resource blocks corresponding to the resources of drawing 1500 for the signaling of FIG. 12 in cell 1 1106. CID signals (1202, 1204) transmitted by WT 1 1110 and WT 2 1112 corresponding to connection 1126 are represented by ascending from left to right diagonal lines shading. CID signals (1206, 1208) transmitted by WT 3 1114 and WT 4 1116 corresponding to connection 1128 are represented by horizontal line shading. CID signals (1210, 1212) transmitted by WT 5 1118 and WT 6 1120 corresponding to connection 1130 are represented by descending from left to right diagonal lines shading.

It may be observed that the WT 1 1110 and WT 2 1112 corresponding to connection 1126 and using CID=1 are transmitting in block 1 and monitoring during block 2. It may also be observed that the WT 5 1118 and WT 6 1120 corresponding to connection 1130 and using CID=1 are also transmitting in block 1 and monitoring during block 2. Therefore, the two pairs of wireless terminals are unable to detect, at this time, that both connections are using the same CID without assistance. Base station 1 1102 has been monitoring CIDs usage and receives the signals transmitted on CID=1 block 1 broadcast resource 1506. Base station 1 1102 detects, via the observed received signals on the CID resources, that the two connections are using the same CID, CID=1, within its coverage area. In some embodiments, received energy levels are detected and variation in the energy level is used to identify that two pairs of devices are using the same CID. In this example, a high level is detected on tone-symbols 1522 and 1524, and lower non-null levels are detected on tone-symbols 1526 and 1528 of CID=1 block 1 resource 1506, indicating that two connections are using the same CID. In this example, Base station 1 1102 takes action, e.g., generates and transmits signal 1304 instructing a pair of devices (1118, 1120) to switch its CID from CID=1 to another CID.

Base station 1 1102 has detected a null condition on tone-symbol 1530 and a relatively uniform energy level on tone-symbols 1532, 1534, 1536, of CID=2 block 2 resource 1516, as well as no detected transmissions on CID=2 block 1 resource 1508. Therefore, base station 1 1102 determines that multiple connections are not using CID=2 in its coverage area.

In some other embodiments, the CID signals transmitted by the peer to peer devices have different characteristics, e.g., information is conveyed via phase. In some embodiments, a peer to peer device transmitting a CID signal transmits a non-null signal into each of its tone-symbols corresponding to the CID and selected transmission block. In some such embodiments, CID signals corresponding to different connections, but using the same CID, have different characteristics and/or convey different information allowing a base station receiving both signals superimposed on the same resource to identify that two connection are using the same CID.

Figure 16:
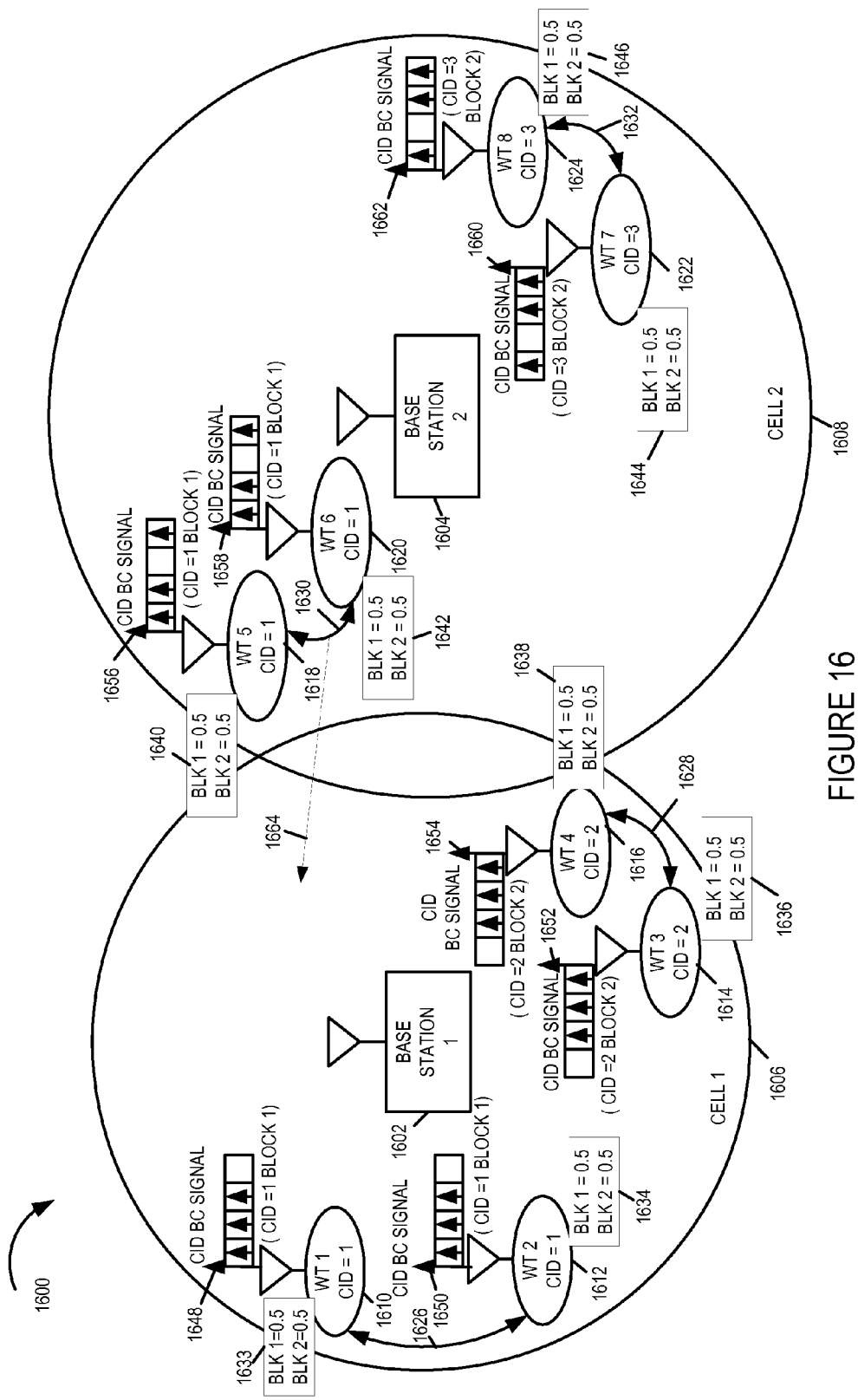
FIG. 16 is a first drawing in a sequence of drawings which illustrates an example in which a base station tracks usage of peer to peer connection identifiers by pairs of communications devices, detects multiple pairs of communications devices within its coverage area using the same connection identifier, and performs an operation to increase the probability of collision detection.

FIGS. 16-20 illustrate an example, in accordance with some embodiments, in which a base station tracks usage of connection identifiers by pairs of communications devices, detects multiple pairs of communications devices within its coverage area using the same connection identifier, and performs an operation to increase the probability of collision detection. FIG. 16 is a drawing illustrating two adjacent base stations (base station 1 1602, base station 2 1604), with corresponding coverage areas (cell 1 1606, cell 2 1608), respectively. Within cell 1 1606 there are a plurality of mobile wireless terminals using peer to peer communications (WT 1 1610, WT 2 1612, WT 3 1614, WT 4 1616). Within cell 2 1608 there are a plurality of mobile wireless terminals using peer to peer communications (WT 5 1618, WT 6 1620, WT 7 1622, WT 8 1624). Consider that the peer to peer wireless communications system is using a recurring frequency timing structure in accordance with FIGS. 8-10. The base stations (1602, 1604) are, e.g., any of the base stations of system 100 of FIG. 1. The base stations are (1602, 1604) implement a method in accordance with flowchart 200 of FIG. 2 and/or are implemented in accordance with FIG. 3 and/or FIG. 4. The wireless terminals (1610, 1612, 1614, 1616, 1618, 1620, 1622, 1624) are, e.g., any of the peer to peer wireless terminals of system 100 of FIG. 1.

WT 1 1610 and WT 2 1612 have peer to peer connection 1626 and are using CID=1 corresponding to their connection 1626. WT 3 1614 and WT 4 1616 have peer to peer connection 1628 and are using CID=2 corresponding to their connection 1628. WT 5 1618 and WT 6 1620 have peer to peer connection 1630 and are using CID=1 corresponding to their connection 1630. WT 7 1622 and WT 8 1624 have peer to peer connection 1632 and are using CID=3 corresponding to their connection 1632.

WT 1 1610 has connection identifier broadcast block selection weighting values of 0.5 for block 1 and 0.5 for block 2 as indicated in information 1633. These weighting values indicate that there is a 50% probability that WT 1 1610 will select CID block 1 to use to transmit its CID broadcast signal and CID 2 for monitoring, and that there is a 50% probability that WT 1 1610 will select CID block 2 to use to transmit its CID broadcast signal and CID 1 to use for monitoring. WT 2 1612 has connection identifier broadcast block selection weighting values of 0.5 for block 1 and 0.5 for block 2 as indicated in information 1634. These weighting values indicate that there is a 50% probability that WT 2 1612 will select CID block 1 to use to transmit its CID broadcast signal and CID 2 for monitoring, and that there is a 50% probability that WT 2 1612 will select CID block 2 to use to transmit its CID broadcast signal and CID 1 to use for monitoring. In this particular exemplary embodiment, weighting values used by both peer to peer devices of a peer to peer connection are the same, and the selection is the same for both devices of the connection.

WT 3 1614 has connection identifier broadcast block selection weighting values of 0.5 for block 1 and 0.5 for block 2 as indicated in information 1636. WT 4 1616 has connection identifier broadcast block selection weighting values of 0.5 for block 1 and 0.5 for block 2 as indicated in information 1638. WT 5 1618 has connection identifier broadcast block selection weighting values of 0.5 for block 1 and 0.5 for block 2 as indicated in information 1640. WT 6 1620 has connection identifier broadcast block selection weighting values of 0.5 for block 1 and 0.5 for block 2 as indicated in information 1642. WT 7 1622 has connection identifier broadcast block selection weighting values of 0.5 for block 1 and 0.5 for block 2 as indicated in information 1644. WT 8 1624 has connection identifier broadcast block selection weighting values of 0.5 for block 1 and 0.5 for block 2 as indicated in information 1646.

WT 1 1610, has selected use CID block 1 for transmission and transmits CID broadcast signal 1648 on CID=1 block 1 resource. In this example, CID broadcast signal 1648 includes energy on the first three tone-symbols of CID=1 block 1 resource. WT 2 1612, has selected use CID block 1 for transmission and transmits CID broadcast signal 1650 on CID=1 block 1 resource. In this example, CID broadcast signal 1650 includes energy on the first three tone-symbols of CID=1 block 1 resource.

WT 3 1614, has selected use CID block 2 for transmission and transmits CID broadcast signal 1652 on CID=2 block 2 resource. In this example, CID broadcast signal 1652 includes energy on the last three tone-symbols of CID=2 block 2 resource. WT 4 1616, has selected use CID block 2 for transmission and transmits CID broadcast signal 1654 on CID=2 block 2 resource. In this example, CID broadcast signal 1654 includes energy on the last three tone-symbols of CID=2 block 2 resource.

WT 5 1618, has selected use CID block 1 for transmission and transmits CID broadcast signal 1656 on CID=1 block 1 resource. In this example, CID broadcast signal 1656 includes energy on the first, second and fourth tone-symbols of CID=1 block 1 resource. WT 6 1620, has selected use CID block 1 for transmission and transmits CID broadcast signal 1658 on CID=1 block 1 resource. In this example, CID broadcast signal 1658 includes energy on the first, second and fourth tone-symbols of CID=1 block 1 resource.

WT 7 1622, has selected use CID block 2 for transmission and transmits CID broadcast signal 1660 on CID=3 block 2 resource. In this example, CID broadcast signal 1660 includes energy on the first, third and fourth tone-symbols of CID=3 block 2 resource. WT 8 1624, has selected use CID block 2 for transmission and transmits CID broadcast signal 1662 on CID=3 block 2 resource. In this example, CID broadcast signal 1662 includes energy on first, third and fourth tone-symbols of CID=3 block 2 resource.

At this time there is no conflict between peer to peer connection identifier usage. However, WT 5 1618 and WT 6 1620 with their corresponding peer to peer connection 1630 are moving from cell 2 1608 to cell 1 1606, as indicated by arrow 1664.

Figure 17:
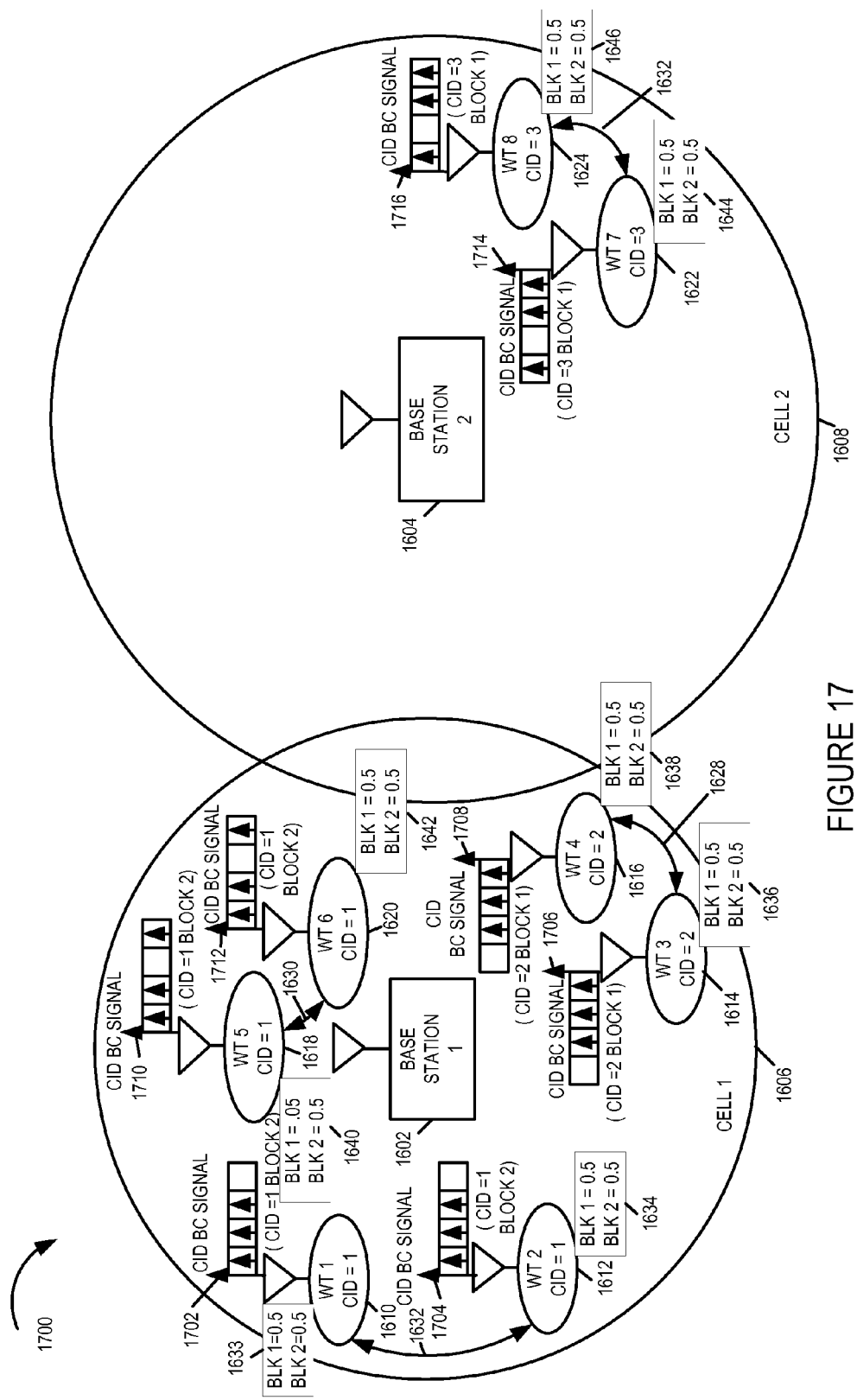
FIG. 17 is a second drawing in a sequence of drawings which illustrates an example in which a base station tracks usage of peer to peer connection identifiers by pairs of communications devices, detects multiple pairs of communications devices within its coverage area using the same connection identifier, and performs an operation to increase the probability of collision detection.

FIG. 17 is a drawing 1700 illustrating exemplary signaling at a time following the sequence of events describes with respect to FIG. 16. In FIG. 17, wireless terminal 5 1618 and wireless terminal 6 1620 with connection 1630 are now located in cell 1 1606.

WT 1 1610, has selected use CID block 2 for transmission and transmits CID broadcast signal 1702 on CID=1 block 2 resource. In this example, CID broadcast signal 1702 includes energy on the first three tone-symbols of CID=1 block 2 resource. WT 2 1612, has selected use CID block 2 for transmission and transmits CID broadcast signal 1704 on CID=1 block 2 resource. In this example, CID broadcast signal 1704 includes energy on the first three tone-symbols of CID=1 block 2 resource.

WT 3 1614, has selected use CID block 1 for transmission and transmits CID broadcast signal 1706 on CID=2 block 1 resource. In this example, CID broadcast signal 1706 includes energy on the last three tone-symbols of CID=2 block 1 resource. WT 4 1616, has selected use CID block 1 for transmission and transmits CID broadcast signal 1708 on CID=2 block 1 resource. In this example, CID broadcast signal 1708 includes energy on the last three tone-symbols of CID=2 block 1 resource.

WT 5 1618, has selected use CID block 2 for transmission and transmits CID broadcast signal 1710 on CID=1 block 2 resource. In this example, CID broadcast signal 1710 includes energy on the first, second and fourth tone-symbols of CID=1 block 2 resource. WT 6 1620, has selected use CID block 2 for transmission and transmits CID broadcast signal 1712 on CID=1 block 2 resource. In this example, CID broadcast signal 1712 includes energy on the first, second and fourth tone-symbols of CID=1 block 2 resource.

WT 7 1622, has selected use CID block 1 for transmission and transmits CID broadcast signal 1714 on CID=3 block 1 resource. In this example, CID broadcast signal 1714 includes energy on the first, third and fourth tone-symbols of CID=3 block 1 resource. WT 8 1624, has selected use CID block 1 for transmission and transmits CID broadcast signal 1716 on CID=3 block 1 resource. In this example, CID broadcast signal 1716 includes energy on first, third and fourth tone-symbols of CID=3 block 1 resource.

Figure 18:
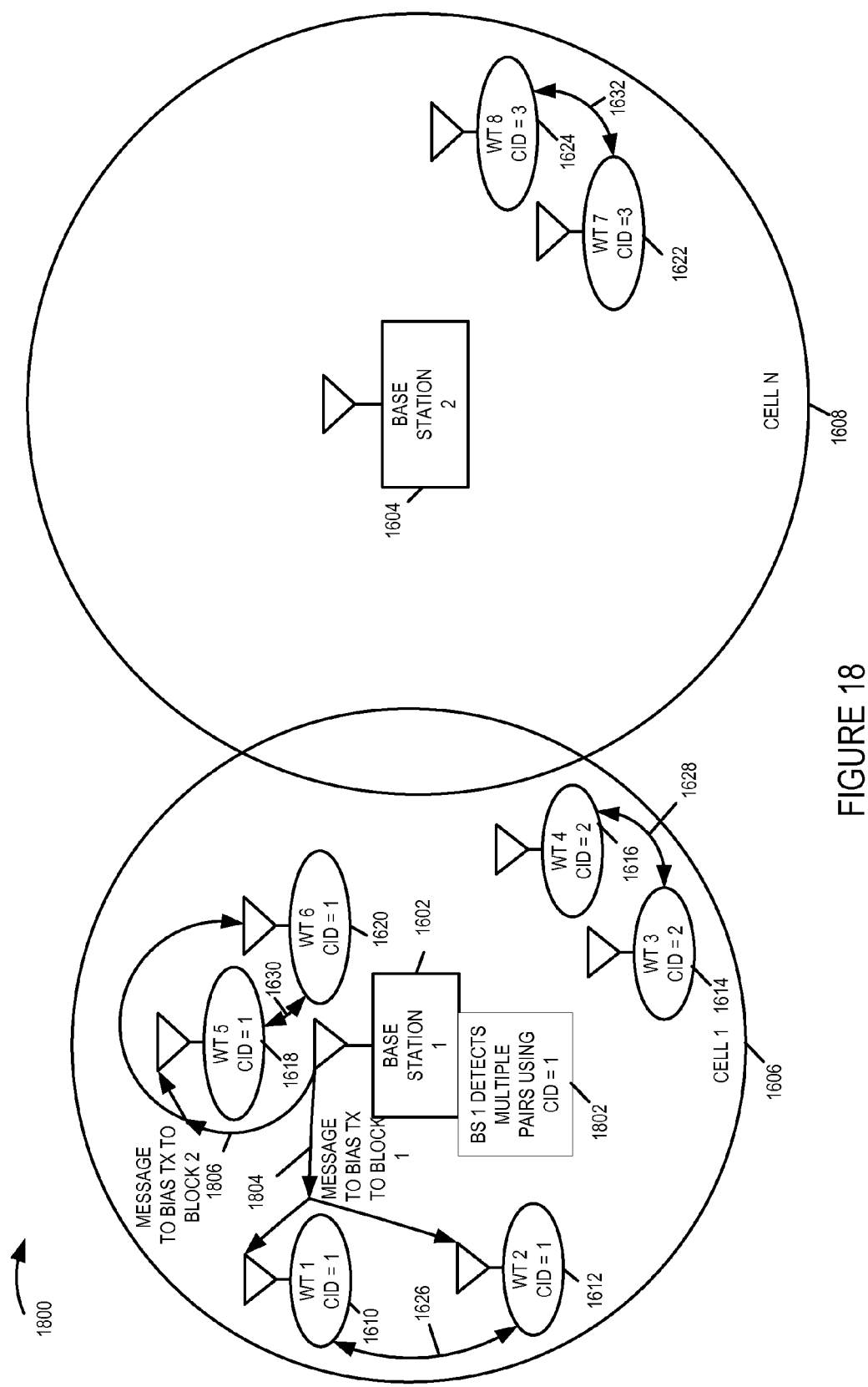
FIG. 18 is a third drawing in a sequence of drawings which illustrates an example in which a base station tracks usage of peer to peer connection identifiers by pairs of communications devices, detects multiple pairs of communications devices within its coverage area using the same connection identifier, and performs an operation to increase the probability of collision detection.

The base stations (1602, 1604) have been tracking the use of CIDs in their coverage areas. Tracking the use of CIDs includes monitoring the CID broadcast signals from the peer to peer wireless terminals. Drawing 1800 of FIG. 18 illustrates that base station 1 1602 detects multiple pairs of devices using the same peer to peer connection identifier in its coverage region and performs an operation to increase the probability of collision detection by the peer to peer devices of the two connections using the same CID. Block 1802 indicates that base station 1 1602 has detected multiple pairs of peer to peer device using CID=1. WT 1 1610 and WT 2 1612 with connection 1626 are using CID=1; WT 5 1618 and WT 6 1620 with connection 1630 are also using CID=1. Base station 1 1602 generates and transmits signal 1804 to WT 1 1610 and WT 2 1612. Signal 1804 includes a message to bias use of connection identifier broadcast signaling transmission resources to the first block. In some embodiments, information indicating specific block selection weighting values are communicated. In other embodiments, a specified change in block selection weighting values is communicated. In still other embodiments, an indication is communicated as to which block to favor for transmission and which block to favor for monitoring. In this example, consider that message 1804 includes a weighting value for block one of 0.8 and a weighting value for block 2 of 0.2. This indicates that 80% of the time WT 1 1610 and WT 2 1612 should use block 1 for transmission of its CID and 20% of the time WT 1 1610 and WT 2 1612 should use block 2 for transmission of its CID.

Base station 1 1602 also generates and transmits signal 1806 to WT 5 1618 and WT 6 1620. Signal 1806 includes a message to bias use of connection identifier broadcast signaling transmission resources to the second block. In this example, consider that message 1806 includes a weighting value for block 2 of 0.2 and a weighting value for block 2 of 0.8. This indicates that 20% of the time WT 5 1618 and WT 6 1620 should use block 2 for transmission of its CID and 80% of the time WT 5 1618 and WT 6 1620 should use block 2 for transmission of its CID.

This biasing of block selection weighting values, under the control of base station 1 1602, increases the likelihood that the two connections (1626, 1630) using the same CID, CID=1, will be able to quickly identify the collision when they are in range of one another.

Figure 19:
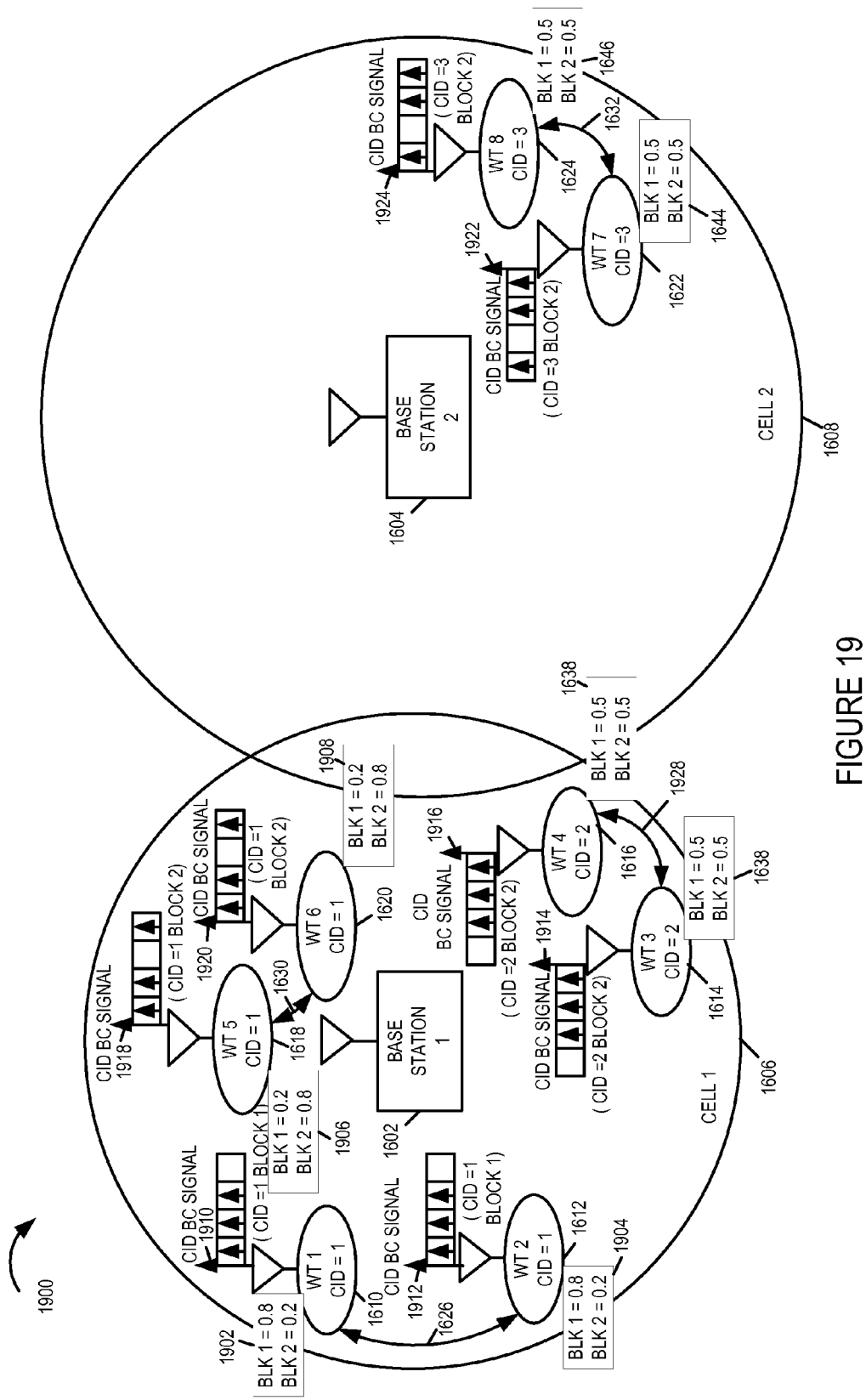
FIG. 19 is a fourth drawing in a sequence of drawings which illustrates an example in which a base station tracks usage of peer to peer connection identifiers by pairs of communications devices, detects multiple pairs of communications devices within its coverage area using the same connection identifier, and performs an operation to increase the probability of collision detection.

FIG. 19 is a drawing 1900 illustrating that WT 1 1610 and WT 2 1612 have changed their connection identifier broadcast selection weighting values to: BLK 1=0.8 and BLK 2=0.2, as indicated by information 1902 and information 1906. Drawing 1900 also illustrates that WT 5 1618 and WT 6 1620 have changed their connection identifier broadcast selection weighting values to: BLK 1=0.2 and BLK 2=0.8, as indicated by information 1906 and information 1908. Thus the devices (1610, 1612) of connection 1626 now favor transmitting their CID in block 1 and monitoring for other CID signals from other devices in block 2, and the devices (1618, 1620) of connection 1630 now favor transmitting their CID in block 2 and monitoring for other CID signals from other devices in block 1.

WT 1 1610, has selected use CID block 1 for transmission and transmits CID broadcast signal 1910 on CID=1 block 1 resource. In this example, CID broadcast signal 1910 includes energy on the first three tone-symbols of CID=1 block 1 resource. WT 2 1612, has selected use CID block 1 for transmission and transmits CID broadcast signal 1912 on CID=1 block 1 resource. In this example, CID broadcast signal 1912 includes energy on the first three tone-symbols of CID=1 block 1 resource.

WT 3 1614, has selected use CID block 2 for transmission and transmits CID broadcast signal 1914 on CID=2 block 2 resource. In this example, CID broadcast signal 1914 includes energy on the last three tone-symbols of CID=2 block 2 resource. WT 4 1616, has selected use CID block 2 for transmission and transmits CID broadcast signal 1916 on CID=2 block 2 resource. In this example, CID broadcast signal 1916 includes energy on the last three tone-symbols of CID=2 block 2 resource.

WT 5 1618, has selected use CID block 2 for transmission and transmits CID broadcast signal 1918 on CID=1 block 2 resource. In this example, CID broadcast signal 1918 includes energy on the first, second and fourth tone-symbols of CID=1 block 2 resource. WT 6 1620, has selected use CID block 2 for transmission and transmits CID broadcast signal 1920 on CID=1 block 2 resource. In this example, CID broadcast signal 1920 includes energy on the first, second and fourth tone-symbols of CID=1 block 2 resource.

WT 7 1622, has selected use CID block 2 for transmission and transmits CID broadcast signal 1922 on CID=3 block 2 resource. In this example, CID broadcast signal 1922 includes energy on the first, third and fourth tone-symbols of CID=3 block 2 resource. WT 8 1624, has selected use CID block 2 for transmission and transmits CID broadcast signal 1924 on CID=3 block 2 resource. In this example, CID broadcast signal 1924 includes energy on first, third and fourth tone-symbols of CID=3 block 2 resource.

Figure 20:
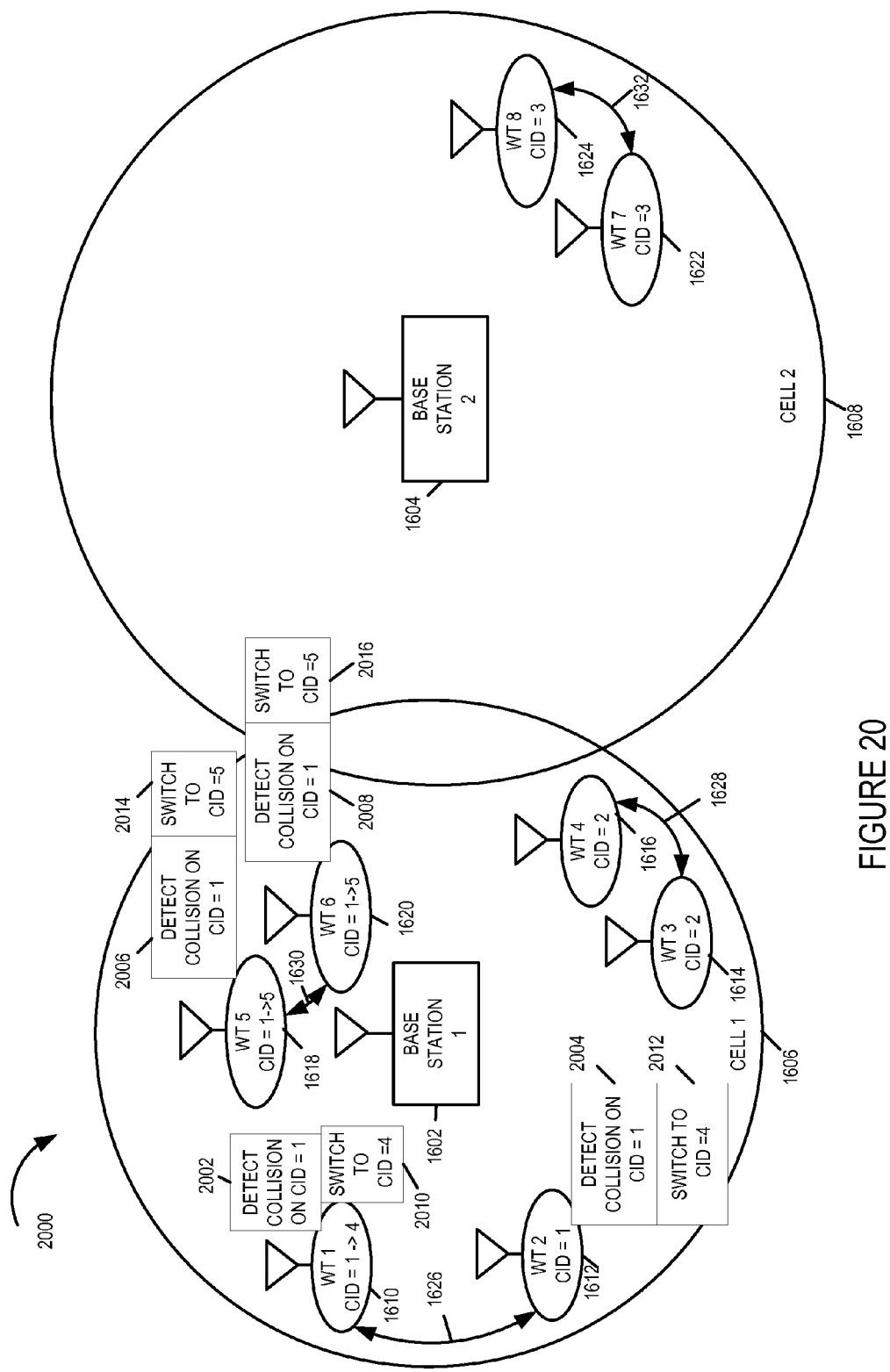
FIG. 20 is a fifth drawing in a sequence of drawings which illustrates an example in which a base station tracks usage of peer to peer connection identifiers by pairs of communications devices, detects multiple pairs of communications devices within its coverage area using the same connection identifier, and performs an operation to increase the probability of collision detection.

FIG. 20 includes a drawing 2000 indicating detection of collision on a CID and switching to another CID based on the signaling of FIG. 19. The two connections (1626, 1630) using the same CID, CID=1, are aware of each other because the connection 1626 CID transmissions (1910, 1912) are during the time of monitoring for connection 1630 devices, which is block 1, and the connection 1630 CID transmissions (1918, 1920) are during the time of monitoring for connection 1626 devices, which is block 2. Wireless terminal 1 1610 detects a collision on CID=1, as indicated by box 2002. Wireless terminal 2 1612 detects a collision on CID=1, as indicated by box 2004. Wireless terminal 5 1618 detects a collision on CID=1, as indicated by box 2006. Wireless terminal 6 1620 detects a collision on CID=1, as indicated by box 2008. WT 1 1610 and WT 2 1612 decide to switch to CID=4 as indicated by boxes (2010, 2012). WT 5 1618 and WT 6 1620 decide to switch to CID=5 as indicated by boxes (2014, 2016). In this example, each of the peer to peer devices of the links in conflict with regard to CID=1, detected the collision condition. In general, depending upon the location of the devices, with respect to one another, one of the four devices will be the first to detect the collision condition on CID=1 and initiate action on its connection to change the CID being used by its connection to a new CID that both devices of its connection deem to be available.

Figure 21:
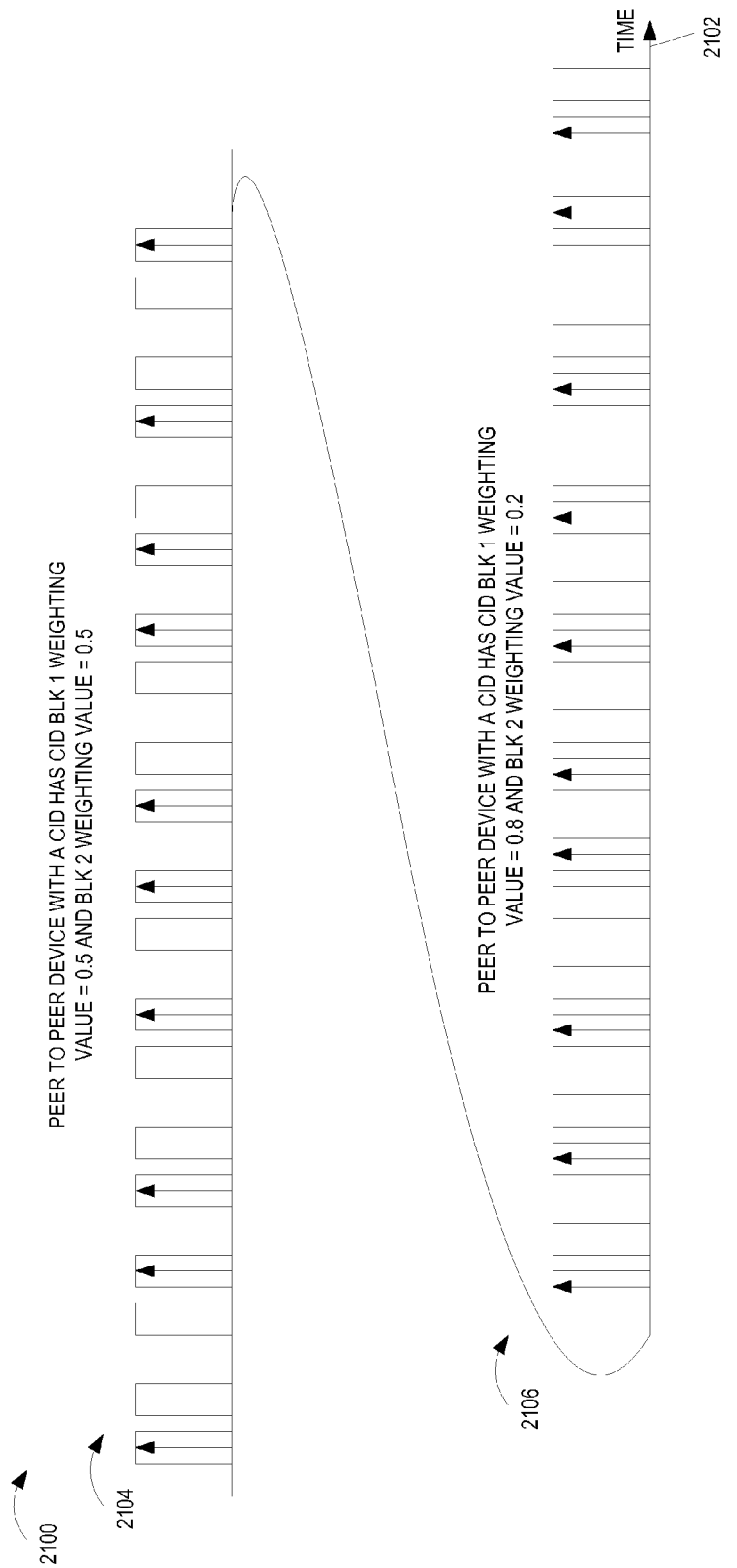
FIG. 21 is a drawing illustrating exemplary connection identifier broadcast signaling by a peer to peer wireless communications device at different times in which the wireless communications device has different weighting values corresponding to selection of which connection identifier block is to be used for transmission of its connection identifier broadcast signal and which block is to be used for monitoring.

FIG. 21 is a drawing 2100 illustrating exemplary CID broadcast signaling by a peer to peer wireless communications device at different times in which the wireless communications device has different weighting values corresponding to selection of which CID block is to be used for transmission of its CID broadcast signal and which block is to be used for monitoring. Drawing 2100 includes a horizontal axis 2102 representing time. The pairs of rectangles along axis 2102 represent pairs of CID resource blocks (block 1, block 2) corresponding to successive iterations in the recurring timing structure.

During a first time period illustrated by section 2104, the exemplary peer to peer device has a CID and has a CID block 1 weighting value of 0.5 and a CID block 2 weighting value of 0.5. Over a long time period, the device is equally likely to: (i) transmit its CID signal in block 1 and monitor in block 2 and (ii) monitor in block 2 and transmit its CID signal in block 2. Each scenario has a 50% probability. In this example, the peer to peer device transmits its CID signal in block 1 during iterations 1, 3, 6, 8 and 9 of the recurring timing structure; the peer to peer device also transmits its CID in block 2 during iterations 2, 4, 5, 7, 10 of the recurring timing structure.

During a second time period illustrated by section 2106, the exemplary peer to peer device has a CID and has a CID block 1 weighting value of 0.8 and a CID block 2 weighting value of 0.2. Over a long time period, the device is likely to: (i) transmit its CID signal in block 1 and monitor in block 2, with 80% probability and (ii) monitor in block 2 and transmit its CID signal in block 2 with 20% probability. In this example, the peer to peer device transmits its CID signal in block 1 during iterations 11, 12, 13, 15, 16, 17, 18 and 20 of the recurring timing structure; the peer to peer device also transmits its CID in block 2 during iterations 14 and 19 of the recurring timing structure.

Consider that two peer to peer connections of devices are using the same CID, and that a base station, which has been tracking peer to peer CID usage, e.g., over a long time, has detected this condition. The base station by sending messages to bias CID block transmission usage can increase the probability of collision detection between the two connections using the same CID. One connection can be biased to favor block 1 for transmission and block 2 for monitoring, while the other connection can be biased to favor block 2 for transmission and block 1 for reception.

Figure 22:
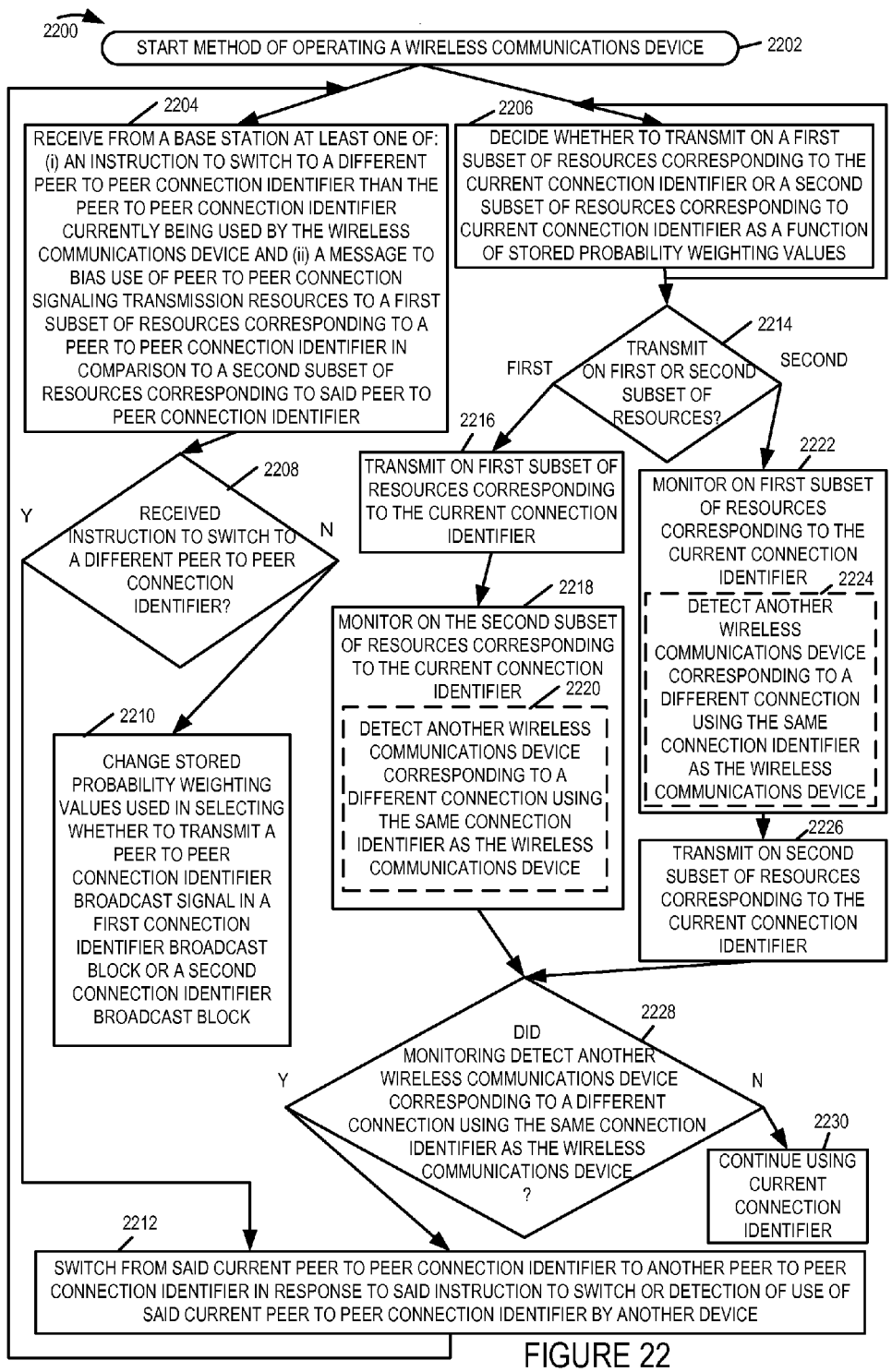
FIG. 22 is a drawing of a flowchart of an exemplary method of operating a wireless communications device in accordance with various exemplary embodiments.

FIG. 22 is a drawing of a flowchart 2200 of an exemplary method of operating a wireless communications device in accordance with various exemplary embodiments. The wireless communications device is, e.g., one of the wireless communications devices of system 100 of FIG. 1 supporting peer to peer communications. Operation starts in step 2202 where the wireless communications device is powered on and initialized. Operation proceeds from start step 2202 to step 2204 and step 2206.

In step 2204 the wireless communications device receives from a base station at least one of: (i) an instruction to switch to a different peer to peer connection identifier than the peer to peer connection identifier currently being used by the wireless communications device and (ii) a message to bias use of peer to peer connection signaling transmission resources to a first subset of resources corresponding to a peer to peer connection identifier in comparison to a second subset of resources corresponding to said peer to peer connection identifier. Operation proceeds from step 2204 to step 2208.

In step 2208 the wireless communications device determines if it has received an instruction to switch to a different peer to peer connection identifier in step 2204. If the wireless communications device has received an instruction to switch to a different connection identifier, then operation proceeds from step 2208 to step 2212. However, if the wireless communications device has not received an instruction to switch to a different peer to peer connection identifier, then operation proceeds from step 2208 to step 2210. In step 2210 the wireless communications device changes stored probability weighting values used in selecting whether to transmit a peer to peer connection identifier broadcast signal in a first connection identifier broadcast block or a second connection identifier broadcast block. The change is based on information received in the message to bias use of peer to peer connection signaling transmission resources of step 2204.

Returning to step 2206, step 2206 is performed for each peer to peer connection identifier broadcast resource interval in the recurring peer to peer timing structure in which the wireless communications has a peer to peer connection. In step 2206, the wireless communications device decides whether to transmit on a first subset of resources corresponding to the current connection identifier or a second subset of resources corresponding to the current connection identifier as a function of stored probability weighting values. The stored probability weighting values may have been, and sometimes are, updated in step 2210. Operation proceeds from step 2206 to step 2214, and back to step 2206.

In step 2214 the wireless communications device proceeds from step 2214 to step 2216, if the decision of step 2206 is to transmit on the first subset of resources. However, if the decision of step 2206 is to transmit on the second subset of resources, then operation proceeds from step 2214 to step 2222.

Returning to step 2216, in step 2216 the wireless communications device transmits on the first subset of resources corresponding to the current connection identifier. Then in step 2218, the wireless communications device monitors on the second subset of resources corresponding to the current connection identifier. Step 2218 may, and sometimes does, include step 2220, in which the wireless communications device detects another wireless communications device corresponding to a different connection using the same connection identifier as the wireless communications device. Operation proceeds from step 2218 to step 2228.

Returning to step 2222, in step 2222 the wireless communications monitors on the first subset of resources corresponding to the current connection identifier. Step 2222 may, and sometimes does, include step 2224, in which the wireless communications device detects another wireless communications device corresponding to a different connection using the same connection identifier as the wireless communications device. Then, in step 2226 the wireless communications device transmits on the second subset of resources corresponding to the current connection identifier. Operation proceeds from step 2226 to step 2228.

In step 2230, the wireless communications device determines if the monitoring of step 2218 or step 2222 has detected another wireless communications device corresponding to a different connection using the same connection identifier as the wireless communications device. If the monitoring has not detected another wireless communications corresponding to a different connection using the same connection identifier as the wireless communications device, then operation proceeds from step 2228 to step 2230, in which the wireless communications device continues to use the current connection identifier. However, if the monitoring has detected another wireless communications device corresponding to a different connection using the same connection identifier as the wireless communications device, then operation proceeds from step 2228 to step 2212.

In step 2212 the wireless communications device switches from said current peer to peer connection identifier to another peer to peer connection identifier in response to said instruction to switch or detection of use of said current peer to peer connection identifier by another device. Operation proceeds from step 2212 to step 2204.

In various embodiments, the first and second subsets of resources are set of tone-symbols. In some such embodiments, the message controls the wireless communications device to transmit signals on tone-symbols in said first subset of resources more than on tone-symbols in the second subset of resources. In some embodiments, the message communicates a probability weighting value to be used in selecting whether to transmit a peer to peer connection identifier broadcast signal in a first connection identifier broadcast block or a second connection identifier broadcast block.

Figure 23:
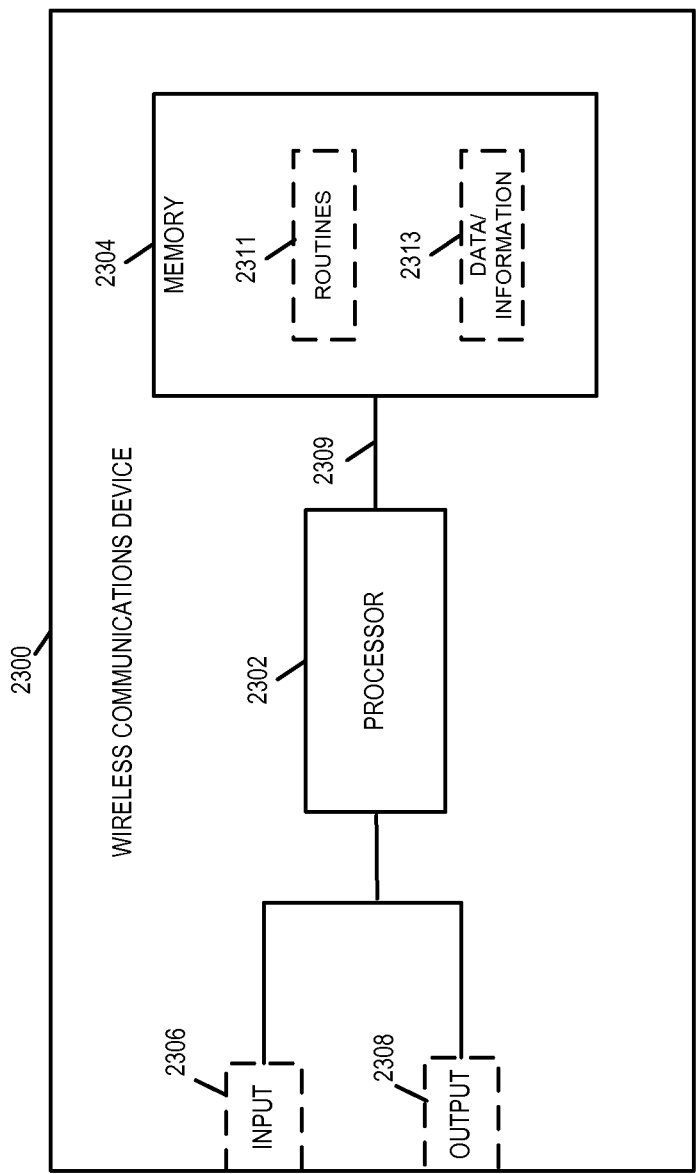
FIG. 23 is a drawing of an exemplary wireless communications device supporting peer to peer communications in accordance with an exemplary embodiment.

FIG. 23 is a drawing of an exemplary wireless communications device supporting peer to peer communications 2300 in accordance with an exemplary embodiment. Exemplary wireless communications device 2300 is, e.g., one of the wireless communications devices of system 100 of FIG. 1 which support peer to peer communications. Exemplary wireless communications device 2300 may, and sometimes does, implement a method in accordance with flowchart 2200 of FIG. 22.

Wireless communications device 2300 includes a processor 2302 and memory 2304 coupled together via a bus 2309 over which the various elements (2302, 2304) may interchange data and information. Wireless communications device 2300 further includes an input module 2306 and an output module 2308 which may be coupled to processor 2302 as shown. However, in some embodiments, the input module 2306 and output module 2308 are located internal to the processor 2302. Input module 2306 can receive input signals. Input module 2306 can, and in some embodiments does, include a wireless receiver and/or a wired or optical input interface for receiving input. Output module 2308 may include, and in some embodiments does include, a wireless transmitter and/or a wired or optical output interface for transmitting output. In some embodiments, memory 2304 includes routines 2311 and data/information 2313.

In various embodiments, processor 2302 is configured to: receive from a base station at least one of: (i) an instruction to switch to a different peer to peer connection identifier than the peer to peer connection identifier currently being used by the wireless communications device and (ii) a message to bias use of peer to peer connection signaling transmission resources to a first subset of resources corresponding to a peer to peer connection identifier in comparison to a second subset of resources corresponding to said peer to peer connection identifier. In some such embodiments processor 2302 is further configured to switch from said current peer to peer connection identifier to another peer to peer connection identifier in response to said instruction to switch or detection of use of said current peer to peer connection identifier by another device.

In some embodiments, said first and second subsets of resources are sets of tone-symbols, and the said first message controls the wireless communications device to transmit signals on tone-symbols in said first subset of resources more than on tone-symbols in said second subset of resources. In some embodiment, said message communicates a probability weighting value to be used in selecting whether to transmit a peer to peer connection identifier broadcast signal in a first connection identifier broadcast block or a second connection identifier broadcast block.

Processor 2302, in some embodiments, is configured to: monitor on the first subset of resources for a signal from another wireless communications device when not transmitting on the first subset of resources; and monitor on the second subset of resources for a signal from another wireless communications device when not transmitting on the second subset of resources. In various embodiments, processor 2302 is further configured to: detect another wireless communications device corresponding to a different connection using the same peer to peer connection identifier as the wireless communications device.

Figure 24:
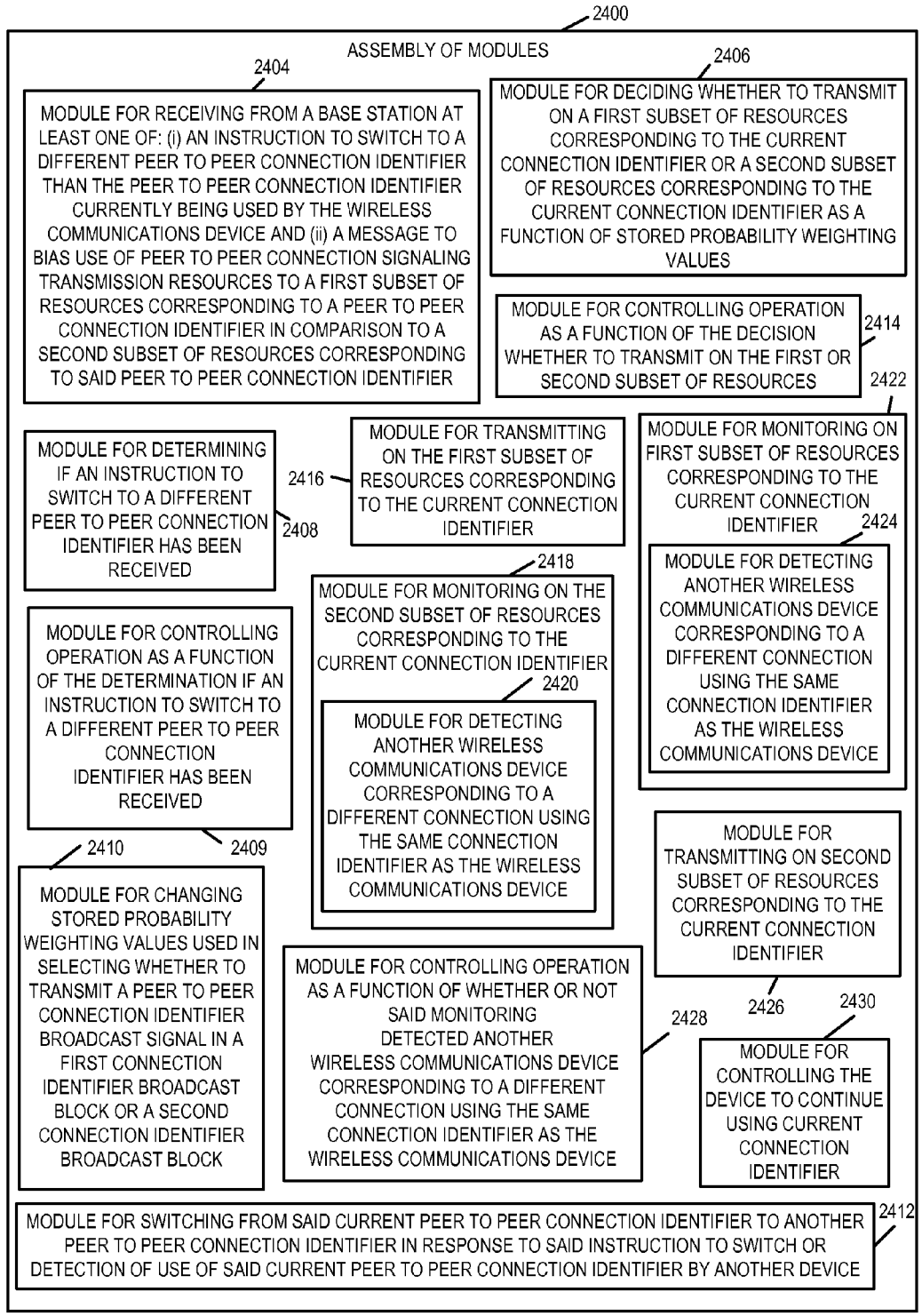
FIG. 24 is an assembly of modules which can, and in some embodiments is, used in the exemplary wireless communications device illustrated in FIG. 23.

FIG. 24 is an assembly of modules 2400 which can, and in some embodiments is, used in the exemplary wireless communications device 2300 illustrated in FIG. 23. The modules in the assembly 2400 can be implemented in hardware within the processor 2302 of FIG. 23, e.g., as individual circuits. Alternatively, the modules may be implemented in software and stored in the memory 2304 of wireless communications device 2300 shown in FIG. 23. In some such embodiments, the assembly of modules 2400 is included in routines 2311 of memory 2304 of device 2300 of FIG. 23. While shown in the FIG. 23 embodiment as a single processor, e.g., computer, it should be appreciated that the processor 2302 may be implemented as one or more processors, e.g., computers. When implemented in software the modules include code, which when executed by the processor, configure the processor, e.g., computer, 2302 to implement the function corresponding to the module. In some embodiments, processor 2302 is configured to implement each of the modules of the assembly of modules 2400. In embodiments where the assembly of modules 2400 is stored in the memory 2304, the memory 2304 is a computer program product comprising a computer readable medium, e.g., a non-transitory computer readable medium, comprising code, e.g., individual code for each module, for causing at least one computer, e.g., processor 2302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 24 control and/or configure the wireless communications device 2300 or elements therein such as the processor 2302, to perform the functions of the corresponding steps illustrated and/or described in the method of flowchart 2200 of FIG. 22.

Assembly of modules 2400 includes a module 2420 for receiving from a base station at least one of: (i) an instruction to switch to a different peer to peer connection identifier than the peer to peer connection identifier currently being used by the wireless communications device and (ii) a message to bias use of peer to peer connection signaling transmission resources to a first subset of resources corresponding to a peer to peer connection identifier in comparison to a second subset of resources corresponding to said peer to peer connection identifier and a module 2406 for deciding whether to transmit on a first subset of resources corresponding to the current connection identifier or a second subset of resources corresponding to the current connection identifier as a function of stored probability weighting values. Assembly of modules 2400 further includes a module 2408 for determining if an instruction to switch to a different peer to peer connection identifier has been received by module 2404, and a module 2409 for controlling operation as a function of the determination if an instruction to switch to a different per to peer connection identifier has been received.

Assembly of modules 2400 further includes a module 2412 for switching from said current peer to peer connection identifier to another peer to peer connection identifier in response to said instruction to switch or detection of use of said current connection identifier by another device. Assembly of modules 2400 further includes a module 2414 for controlling operation as function of the decision by module 2406 whether to transmit on the first or second subset of resources, a module 2416 for transmitting on the first subset of resources corresponding to the current connection identifier when the decision is to transmit on the first subset of resources, a module 2418 for monitoring on the second subset of resources corresponding to the current connection identifier when the decision is to transmit on the first subset of resources, a module 2422 for monitoring on the first subset of resources corresponding to the current connection identifier when the decision is to transmit on the second subset of resources, and a module 2426 for transmitting on the second subset of resources corresponding to the current connection identifier when the decision is to transmit on the second subset of resources. Module 2418 includes a module 2420 for detecting another wireless communications device corresponding to a different connection using the same connection identifier as the wireless communications device. Module 2422 includes a module 2424 for detecting another wireless communications device corresponding to a different connection using the same connection identifier as the wireless communications device.

Assembly of modules 2400 further includes a module 2428 for controlling operation as a function of whether or not said monitoring has detected another wireless communications device corresponding to a different connection using the same connection identifier as the wireless communications device, and a module 2430 for controlling the wireless communications device to continue using the current connection identifier.

In various embodiments, the first and second subsets of resources are set of tone-symbols. In some such embodiments, the message controls the wireless communications device to transmit signals on ton-symbols in said first subset of resources more than on ton-symbols in the second subset of resources. In some embodiments, the message communicates a probability weighting value to be used in selecting whether to transmit a per to peer connection identifier broadcast signal in a first connection identifier broadcast block or a second connection identifier broadcast block.

Various methods and apparatus described in this application are well suited for use in wireless communications devices and networks supporting peer to peer signaling. In various embodiments a device of any of one or more of FIGS. 1-24 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., base stations, mobile and/or stationary wireless communications devices supporting peer to peer signaling, network nodes and/or communications systems. Various embodiments are also directed to methods, e.g., method of controlling and/or operating base stations, mobile and/or stationary wireless communications devices supporting peer to peer signaling, network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station or a wireless communications device which supports peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes such as base stations, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device, the method comprising:
   receiving from a base station at least one of: (i) an instruction to switch to a different peer to peer connection identifier when a peer to peer connection identifier currently being used by the wireless communications device is being used in a different peer to peer connection and (ii) a message to bias use of peer to peer connection signaling transmission resources to a first subset of resources corresponding to a peer to peer connection identifier in comparison to a second subset of resources corresponding to said peer to peer connection identifier; and
   switching from said current peer to peer connection identifier to another peer to peer connection identifier in response to said instruction to switch or detection of use of said current peer to peer connection identifier by another device.

2. The method of claim 1, wherein said first and second subsets of resources are sets of tone-symbols, said message controlling the wireless communications device to transmit signals on tone-symbols in said first subset of resources more than on tone-symbols in said second subset of resources.

3. The method of claim 1, wherein said message communicates a probability weighting value to be used in selecting whether to transmit a peer to peer connection identifier broadcast signal in a first connection identifier broadcast block or a second connection identifier broadcast block.

4. The method of claim 2, further comprising:
   when not transmitting on the first subset of resources, monitoring on the first subset of resources for a signal from another wireless communications device; and
   when not transmitting on the second subset of resources, monitoring on the second subset of resources for a signal from another wireless communications device.

5. The method of claim 4, further comprising:
   detecting another wireless communications device corresponding to a different connection using the same peer to peer connection identifier as the wireless communications device.

6. A wireless communications device comprising:
   means for receiving from a base station at least one of: (i) an instruction to switch to a different peer to peer connection identifier when a peer to peer connection identifier currently being used by the wireless communications device is being used in a different peer to peer connection and (ii) a message to bias use of peer to peer connection signaling transmission resources to a first subset of resources corresponding to a peer to peer connection identifier in comparison to a second subset of resources corresponding to said peer to peer connection identifier; and
   means for switching from said current peer to peer connection identifier to another peer to peer connection identifier in response to said instruction to switch or detection of use of said current peer to peer connection identifier by another device.

7. The wireless communications device of claim 6, wherein said first and second subsets of resources are sets of tone-symbols, said message controlling the wireless communications device to transmit signals on tone-symbols in said first subset of resources more than on tone-symbols in said second subset of resources.

8. The wireless communications device of claim 6, wherein said message communicates a probability weighting value to be used in selecting whether to transmit a peer to peer connection identifier broadcast signal in a first connection identifier broadcast block or a second connection identifier broadcast block.

9. The wireless communications device of claim 7, further comprising:
   means for monitoring on the first subset of resources for a signal from another wireless communications device when not transmitting on the first subset of resources; and
   means for monitoring on the second subset of resources for a signal from another wireless communications device when not transmitting on the second subset of resources.

10. The wireless communications device of claim 9, further comprising:
    means for detecting another wireless communications device corresponding to a different connection using the same peer to peer connection identifier as the wireless communications device.

11. A non-transitory computer readable medium storing computer executable code for wireless communication by a wireless communications device, comprising code for:
    receiving from a base station at least one of: (i) an instruction to switch to a different peer to peer connection identifier when a peer to peer connection identifier currently being used by the wireless communications device is being used in a different peer to peer connection and (ii) a message to bias use of peer to peer connection signaling transmission resources to a first subset of resources corresponding to a peer to peer connection identifier in comparison to a second subset of resources corresponding to said peer to peer connection identifier; and
    switching from said current peer to peer connection identifier to another peer to peer connection identifier in response to said instruction to switch or detection of use of said current peer to peer connection identifier by another device.

12. A wireless communications device comprising:
a memory; and
at least one processor coupled to the memory and configured to:
receive from a base station at least one of: (i) an instruction to switch to a different peer to peer connection identifier when a peer to peer connection identifier currently being used by the wireless communications device is being used in a different peer to peer connection and (ii) a message to bias use of peer to peer connection signaling transmission resources to a first subset of resources corresponding to a peer to peer connection identifier in comparison to a second subset of resources corresponding to said peer to peer connection identifier; and
switch from said current peer to peer connection identifier to another peer to peer connection identifier in response to said instruction to switch or detection of use of said current peer to peer connection identifier by another device; and
memory coupled to said at least one processor.

13. The wireless communications device of claim 12, wherein said first and second subsets of resources are sets of tone-symbols, said message controlling the wireless communications device to transmit signals on tone-symbols in said first subset of resources more than on tone-symbols in said second subset of resources.

14. The wireless communications device of claim 12, wherein said message communicates a probability weighting value to be used in selecting whether to transmit a peer to peer connection identifier broadcast signal in a first connection identifier broadcast block or a second connection identifier broadcast block.

15. The wireless communications device of claim 12, wherein said at least one processor is further configured to:
monitor on the first subset of resources for a signal from another wireless communications device when not transmitting on the first subset of resources; and
monitor on the second subset of resources for a signal from another wireless communications device when not transmitting on the second subset of resources.

* * * * *